US009546510B2

(12) United States Patent
Baghdasarian

(10) Patent No.: US 9,546,510 B2
(45) Date of Patent: Jan. 17, 2017

(54) HINGE WITH SPRING PRE-LOAD TRANSFER MECHANISM

(71) Applicant: Space Systems/Loral, LLC, Palo Alto, CA (US)

(72) Inventor: Varouj G. Baghdasarian, Cupertino, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 137 days.

(21) Appl. No.: 14/596,096

(22) Filed: Jan. 13, 2015

(65) Prior Publication Data

US 2016/0201372 A1  Jul. 14, 2016

(51) Int. Cl.
  *E05D 3/02*  (2006.01)
  *E05D 11/10*  (2006.01)
  *B64G 1/22*  (2006.01)

(52) U.S. Cl.
  CPC ........... *E05D 11/1014* (2013.01); *B64G 1/222* (2013.01); *E05D 3/02* (2013.01); *E05D 11/1007* (2013.01)

(58) Field of Classification Search
  CPC .... E05D 11/1014; E05D 11/1007; E05D 3/02; B64G 1/222
  See application file for complete search history.

(56) References Cited

U.S. PATENT DOCUMENTS

| 1,639,009 | A | * | 8/1927 | Singley | .................. | A47B 91/00 |
| | | | | | | 182/163 |
| 3,653,079 | A | * | 4/1972 | Bourgraf | ................ | A61G 1/003 |
| | | | | | | 24/611 |
| 3,801,208 | A | * | 4/1974 | Bourgraf | ................ | A61G 1/003 |
| | | | | | | 403/102 |
| 4,393,541 | A | * | 7/1983 | Hujsak | ................. | B25J 17/0241 |
| | | | | | | 16/291 |
| 4,532,674 | A | | 8/1985 | Tobey et al. | | |
| 4,736,490 | A | | 4/1988 | Wesselski | | |
| 5,060,888 | A | | 10/1991 | Vezain et al. | | |
| 5,192,058 | A | | 3/1993 | VanDalsem et al. | | |
| 5,393,018 | A | | 2/1995 | Roth et al. | | |
| 5,674,027 | A | | 10/1997 | Warnaar | | |
| 5,833,176 | A | | 11/1998 | Rubin et al. | | |
| 5,911,536 | A | | 6/1999 | Roth | | |
| 6,126,371 | A | | 10/2000 | McCloskey | | |

(Continued)

OTHER PUBLICATIONS

"Deployable Booms," Astro-und Feinwerktechnik Adlershof GmbH, 2000, 3 pages, www.astrofein.com/2728/dwnld/admin/Deployable_Booms.pdf.

(Continued)

*Primary Examiner* — Justin Benedik
(74) *Attorney, Agent, or Firm* — Weaver Austin Villeneuve & Sampson LLP

(57) ABSTRACT

Latching or locking deployment hinges are provided that include a latch mechanism, a spring-loaded tensioning device, and a trigger mechanism. The trigger mechanism and the spring-loaded tensioning device are configured to transfer the compressed spring load in the spring-loaded tensioning device to the latch mechanism once the hinge has closed sufficiently far enough to latch together, thus inducing a pre-load through the latch mechanism that eliminates gapping in the hinge interface. The hinges may be sprung or actuated using a powered drive mechanism.

20 Claims, 13 Drawing Sheets

(56) References Cited

U.S. PATENT DOCUMENTS

| | | |
|---|---|---|
| 6,175,989 B1 | 1/2001 | Carpenter et al. |
| 6,772,479 B2 | 8/2004 | Hinkley et al. |
| 6,889,411 B2 | 5/2005 | Hinkley et al. |
| 7,594,299 B2 | 9/2009 | Kilpinen |
| 8,282,153 B2 | 10/2012 | Browne et al. |
| 8,393,581 B2 | 3/2013 | Keller et al. |
| 8,540,297 B2 | 9/2013 | Browne et al. |
| 8,540,452 B2 | 9/2013 | Jimenez et al. |
| 8,616,613 B2 | 12/2013 | Browne et al. |
| 8,960,757 B2 * | 2/2015 | Otake .................... B60N 2/065 296/65.13 |
| 9,032,983 B2 * | 5/2015 | Jin .......................... E04H 15/48 135/120.3 |
| 2003/0196298 A1 | 10/2003 | Hinkley et al. |
| 2012/0112010 A1 | 5/2012 | Young et al. |
| 2014/0042275 A1 | 2/2014 | Abrams et al. |

OTHER PUBLICATIONS

U.S. Notice of Allowance dated Jul. 7, 2014, in U.S. Appl. No. 13/665,722.

* cited by examiner

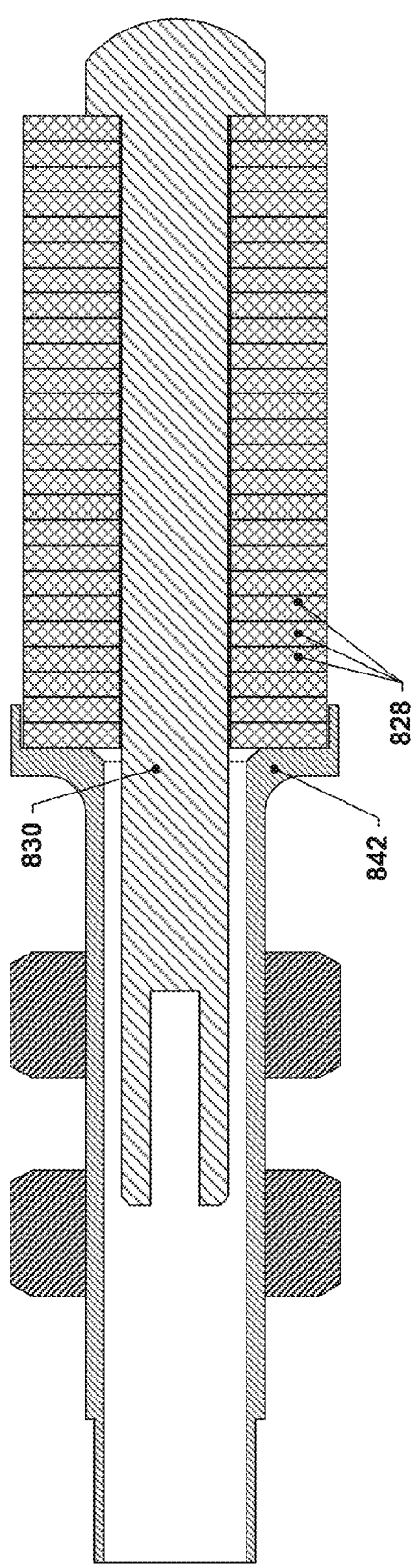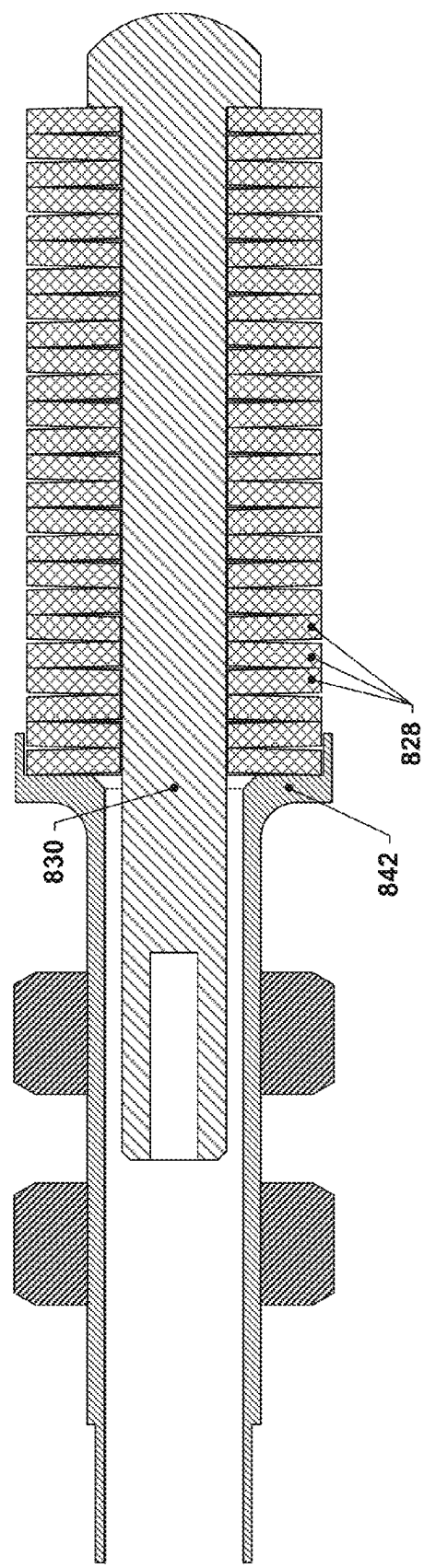

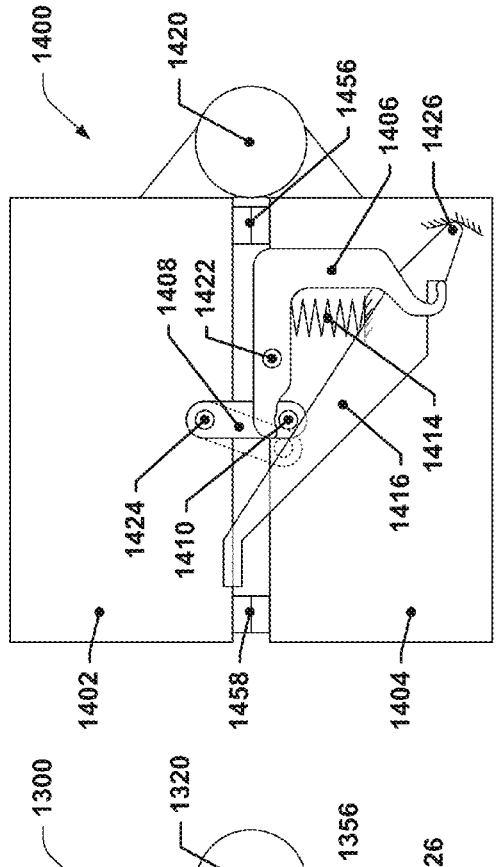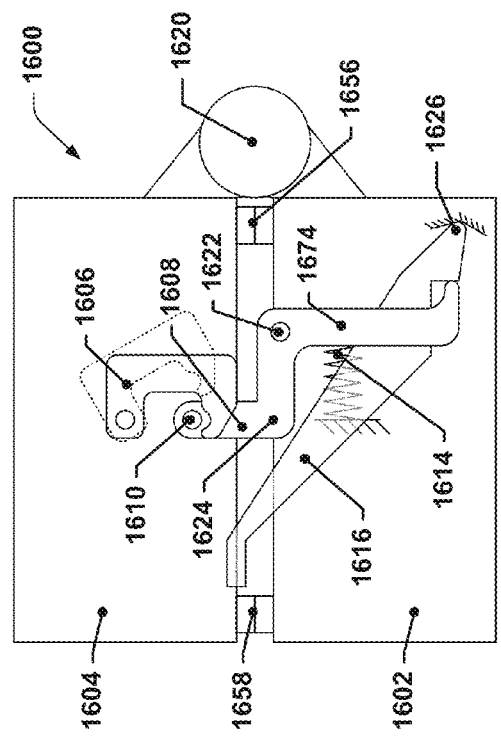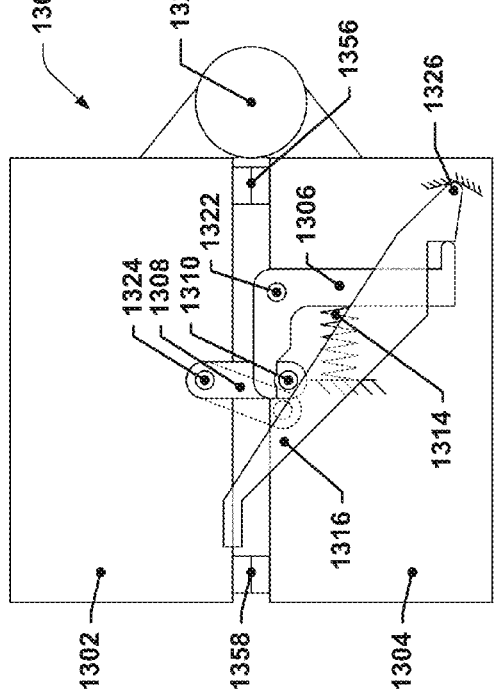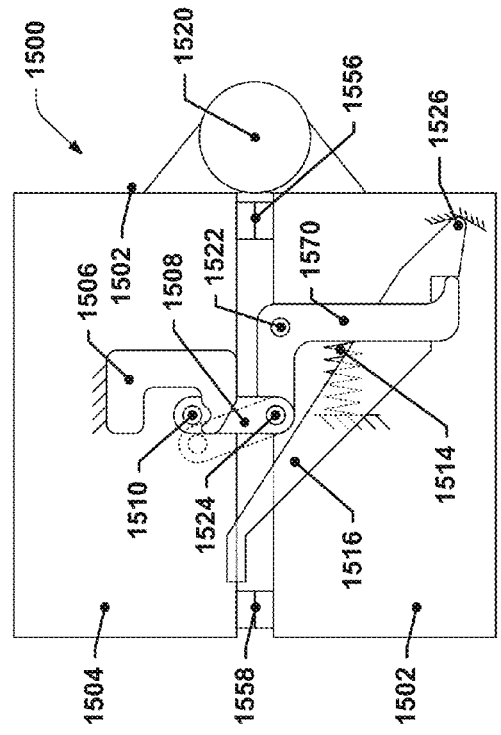
Figure 13
Figure 14
Figure 15
Figure 16

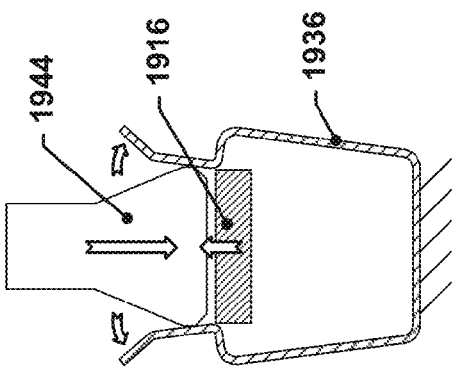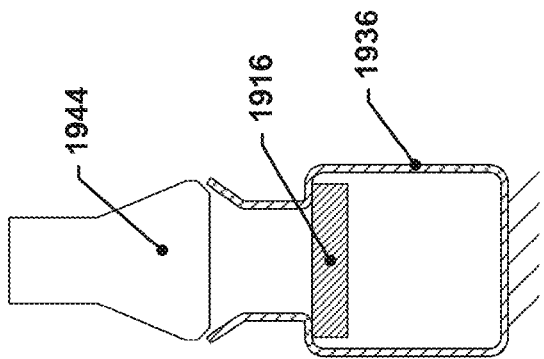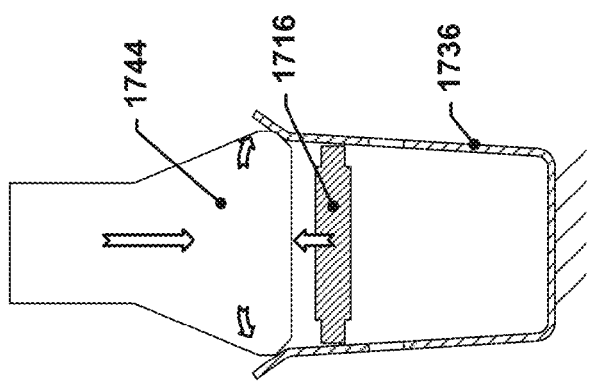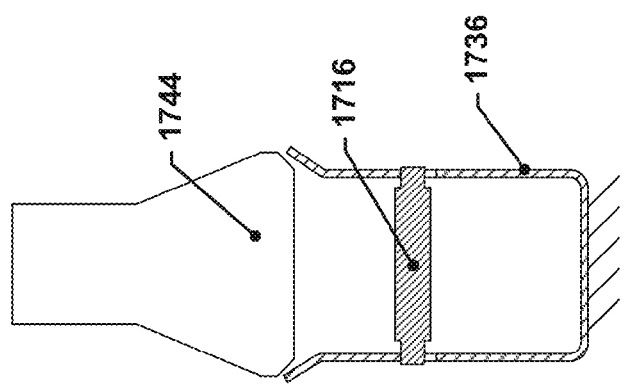

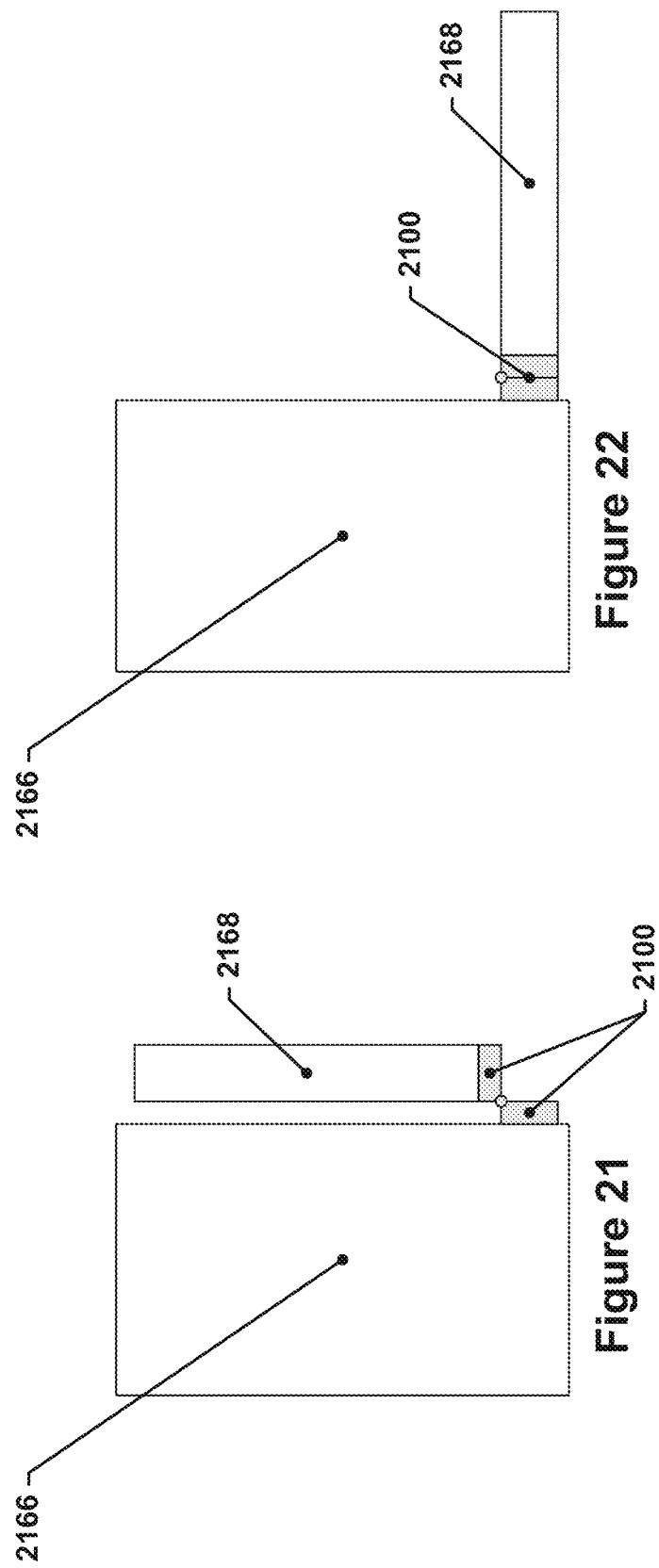

HINGE WITH SPRING PRE-LOAD TRANSFER MECHANISM

TECHNICAL FIELD

This invention relates generally to locking hinges that are equipped with spring-driven pre-loading features. More specifically, this disclosure relates to locking hinges that may be used on spacecraft to allow antenna booms or other deployable structures to be coupled to the spacecraft main body via a hinged connection that, after deployment, may be locked and pre-loaded to prevent or reduce gapping or compliance in the hinge interface.

BACKGROUND OF THE INVENTION

The assignee of the present invention manufactures and deploys spacecraft for, inter alia, communications and broadcast services. Spacecraft often include various deployable structures, e.g., equipment booms, solar arrays, antenna reflectors, antenna masts, etc. Such structures may, for example, often be folded flat against a side of the spacecraft during launch and may then subsequently be deployed using, for example, hinged connections when the spacecraft is on-orbit.

Because of the large distances involved, small misalignments in such a hinge may have significant repercussions in overall system performance. For example, a 0.1 degree misalignment in an antenna reflector for a satellite at an altitude of 37,000 km may cause the resulting terrestrial antenna illumination area to shift by nearly 65 km.

There is thus a need for hinged interfaces for use in satellites that have anti-compliance or anti-gapping capabilities when in the hinge-closed state.

SUMMARY OF INVENTION

The systems, methods and devices of the disclosure each have several innovative aspects, no single one of which is solely responsible for the desirable attributes disclosed herein. One innovative aspect of the subject matter described in this disclosure can be implemented in a variety of ways.

The present inventor has appreciated that a latching hinge that includes a mechanism that causes a compressed spring load to be applied to the latching components after the hinge has been closed and is in the latched state may be used to provide a low-compliance deployment hinge for use in spacecraft or other systems, e.g., a hinge that exhibits a reduced potential for gapping movement, i.e., movement in the hinge that results in a gap opening up between the hinge components. While the inventor has presented several variants of such locking hinges herein, the general concept of using a spring-loaded tensioning device in such a manner may be applied to a variety of other latching hinge designs and all such variants are considered to be within the scope of this disclosure.

In some implementations, a latching hinge is provided that includes a first member, a second member rotatably coupled to the first member about a hinge pivot, a latch link connected with the first member, a latch hook connected with the second member, a spring-loaded tensioning device, and a trigger mechanism. The first member and the second member may be configured to be transitioned between a hinge-open state and a hinge-closed state by rotating one of the first member and the second member with respect to the other of the first member and the second member about the hinge pivot; at least a portion of at least one of the latch link and the latch hook may be configured to move relative to the first member and the second member, respectively, such that the latch hook and a latch portion of the latch link latch together as the first member and the second member are transitioned into the hinge-closed state. The latch link and the latch hook may also prevent the first member and the second member from being transitioned into the hinge-open state from the hinge-closed state when the latch portion of the latch link and the latch hook are latched together. The spring-loaded tensioning device in such a device may be configured to be transitioned between a first compressed state and a second compressed state; a tensile load may be induced in the latch link and the latch hook when the spring-loaded tensioning device is in the second compressed state and the latch portion of the latch link and the latch hook are latched together. The trigger mechanism (i) may be configured to be transitioned between a untriggered state and a triggered state, (ii) may maintain, in the untriggered state, the spring-loaded tensioning device in the first compressed state, (iii) may allow, in the triggered state, the spring-loaded tensioning device to transition from the first compressed state to the second compressed state, and (iv) may be configured to transition from the untriggered state to the triggered state after the latch portion of the latch link and the latch hook have latched together.

In some such implementations, the latch hook may be rotatable about a first pivot and the spring-loaded tensioning device may be configured to exert a first compressive load on a portion of the latch hook to develop a torque about the first pivot when transitioning from the first compressed state to the second compressed state. In such implementations, the latch hook may be drawn into contact with the latch portion of the latch link responsive to the developed torque. In some further such implementations, the latching hinge may further include a latch link bias spring that may be configured to bias the latch link towards the position the latch link is in with respect to the first member when the latch link and the latch hook are latched together. In yet some further such implementations, the latch link may be configured to rotate about a latch link pivot, the latch portion of the latch link may encounter a sloped surface of the latch hook as the first member and the second member transition from the hinge-open state to the hinge-closed state, and the sloped surface of the latch hook may be oblique to the direction along which the tensile load is induced and may engage with the latch portion so as to cause the latch link to rotate about the latch link pivot and deflect the latch link bias spring as the first member and the second member transition into the hinge-closed state.

In some implementations of the latching hinge, the spring-loaded tensioning device may include a linear spring such as a coil spring or a plurality of Belleville washers stacked on a common guide that passes through the center of each Belleville washer. In some such implementations, the spring-loaded tensioning device may have a spring extension axis aligned with the direction along which the tensile load is induced in the latch link and the latch hook when the spring-loaded tensioning device is in the second compressed state and the latch portion of the latch link and the latch hook are latched together. In some alternative such implementations, the spring-loaded tensioning device may have a spring extension axis perpendicular to the direction along which the tensile load is induced in the latch link and the latch hook when the spring-loaded tensioning device is in the second compressed state and the latch portion of the latch link and the latch hook are latched together.

In some implementations of the latching hinge, the latch link may be movably connected with a latch link rotation arm, the latch link rotation arm may be configured to rotate about a first pivot, the spring-loaded tensioning device may be configured to exert a force on a portion of the latch link rotation arm to generate a torque about the first pivot when transitioning from the first compressed state to the second compressed state, and the latch portion of the latch link may be drawn into contact with the latch hook responsive to the torque.

In some implementations of the latching hinge, the trigger mechanism may include a lever arm component configured to rotate about a fulcrum, a trigger, and a release mechanism. In such implementations, the spring-loaded tensioning device may exert a first compressive load on a portion of the latch hook in the first compressed state and a second compressive load on a portion of the latch hook in the second compressed state, the latch hook may contact the lever arm component and transfer the first compressive load from the spring-loaded tensioning device to a first contact zone of the lever arm component and along a first peak magnitude vector when the trigger mechanism is in the untriggered state and may transfer the second compressive load to the latch portion of the latch link when the trigger mechanism is in the triggered state. In such implementations, the release mechanism may be configured to contact the lever arm component at at least one second contact zone and apply a third compressive load on the at least one second contact zone and along a second peak magnitude vector when the spring-loaded tensioning device is in the untriggered state, and to release the lever arm component by removing the third compressive load responsive to engagement with a portion of the first member.

In some implementations of the latching hinge, the release mechanism may be provided by at least one spring arm with a detent. The detent may engage with the lever arm component at the second contact zone and may resist movement of the lever arm component due to the first compressive load when engaged. The trigger may be configured to contact the at least one spring arm and to deflect the at least one spring arm as the first member and the second member are transitioned into the hinge-closed state, and the deflection of the at least one spring arm by the trigger may then cause the detent to move such that the detent releases the lever arm.

In some implementations of the latching hinge, the shortest distance A between the first peak magnitude vector and the fulcrum may be at least an order of magnitude less than the shortest distance B between the second peak magnitude vector and the fulcrum. In some such implementations, the shortest distance A between the first peak magnitude vector and the fulcrum may be less than $1/50^{th}$ of the shortest distance B between the second peak magnitude vector and the fulcrum.

In some implementations of the latching hinge, the first compressive load may be approximately 1500 lbf±200 lbf, the second compressive load may be approximately 750 lbf±100 lbf, the third compressive load may be less than 10 lbf±1 lbf, and the tensile load may be 810 lbf±100 lbf.

In some implementations of the latching hinge, the magnitude of the first compressive load may be multiplied by the ratio of a) the shortest distance C between the first pivot and the peak magnitude vector of the first compressive load to b) the shortest distance D between the first peak magnitude vector and the first pivot as the first compressive load is transferred to the first contact zone by the latch hook. In some such implementations, this ratio may be less than one.

In some implementations of the latching hinge, the lever arm component may be a third-class lever configured to pivot about the fulcrum.

In some implementations of the latching hinge, the latching hinge may also include a radial alignment feature pair including a concave conic surface and a complementary convex conic surface and two or more linear alignment feature pairs. Each linear alignment feature pair may include a concave prismatic surface and a complementary convex prismatic surface. In such implementations, one of the concave conic surface and the convex conic surface may be located on the first member and the other of the concave conic surface and the convex conic surface may be located on the second member such that the concave conic surface and the convex conic surface contact one another when the first member and the second member are in the hinge-closed state. Furthermore, one of the concave prismatic surface and the convex prismatic surface of each linear alignment feature pair may be located on the first member and the other of the concave prismatic surface and the convex prismatic surface of the linear alignment feature pair may be located on the second member such that the concave prismatic surface and the convex prismatic surface of each linear alignment feature pair contact one another when the first member and the second member are in the hinge-closed state. The concave prismatic surface and the convex prismatic surface of each linear alignment feature pair may also contact each other along surfaces that bracket an axis that passes through the center axis of the concave conic surface when the first member and the second member are in the hinge-closed state.

In some such implementations, when the first member and the second member are in the hinge-closed state and the tensile load is induced in the latch link and the latch hook, the tensile load (a) draws the convex conic surface and the concave conic surface of the radial alignment feature pair into contact with one another and (b) draws the convex prismatic surface and the concave conic surface of each linear alignment feature pair into contact with one another.

In some implementations of the latching hinge, the hinge pivot may include a radial clearance gap between portions of the hinge pivot that define the rotatable bearing interface provided by the hinge pivot. In such implementations, there is load transferred between the first member and the second member through the hinge pivot as the first member and the second member transition from the hinge-open state to the hinge-closed state, and there is no load transferred between the first member and the second member via the hinge pivot when the tensile load in the latch link and the latch hook is present.

In some implementations, the latching hinge may be used to connect an extensible equipment boom with a spacecraft. In such implementations, the latching hinge may be in the hinge-open state when the extensible equipment boom is in the stowed state, and the latching hinge may be in the hinge-closed state when the extensible equipment boom is in the deployed state.

Details of one or more implementations of the subject matter described in this specification are set forth in the accompanying drawings and the description below. Other features, aspects, and advantages will become apparent from the description, the drawings, and the claims. Note that the relative dimensions of the following figures, unless otherwise noted, may not be drawn to scale.

BRIEF DESCRIPTION OF THE DRAWINGS

FIGS. 8A and 8B depict an example spring-loaded tensioning device using Belleville washers in two different states of compression.

FIG. 13 depicts a simplified diagram of a latching hinge with a spring-loaded tensioning device similar to the example shown in FIGS. 2 through 12.

FIG. 14 depicts a simplified diagram of an alternative mechanism for a latching hinge with a spring-loaded tensioning device.

FIG. 15 depicts a simplified diagram of another alternative mechanism for a latching hinge with a spring-loaded tensioning device.

FIG. 16 depicts a simplified diagram of yet another alternative mechanism for a latching hinge with a spring-loaded tensioning device.

FIG. 17 depicts a diagram of a release mechanism in an unreleased state.

FIG. 18 depicts a diagram of the release mechanism of FIG. 17 in a released state.

FIG. 19 depicts a diagram of a release mechanism such as that pictured in FIGS. 1 through 12 in an unreleased state.

FIG. 20 depicts a diagram of the release mechanism of FIG. 19 in a released state.

FIG. 21 depicts a schematic of a spacecraft with an extensible equipment boom.

FIG. 22 depicts a schematic of the spacecraft of FIG. 21 with the extensible equipment boom in a deployed state.

FIGS. 1 through 12 are drawn to scale within each Figure, although the Figures may vary in scale from Figure to Figure.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to or with another element, it may be directly connected or coupled to or with the other element, or intervening elements may be present. Furthermore, "connected" or "coupled" as used herein in an electrical context may include wirelessly connected or coupled. As used herein, the term "and/or" includes any and all combinations of one or more of the associated listed items. The symbol "/" may also be used as a shorthand notation for "and/or."

Figure 1:
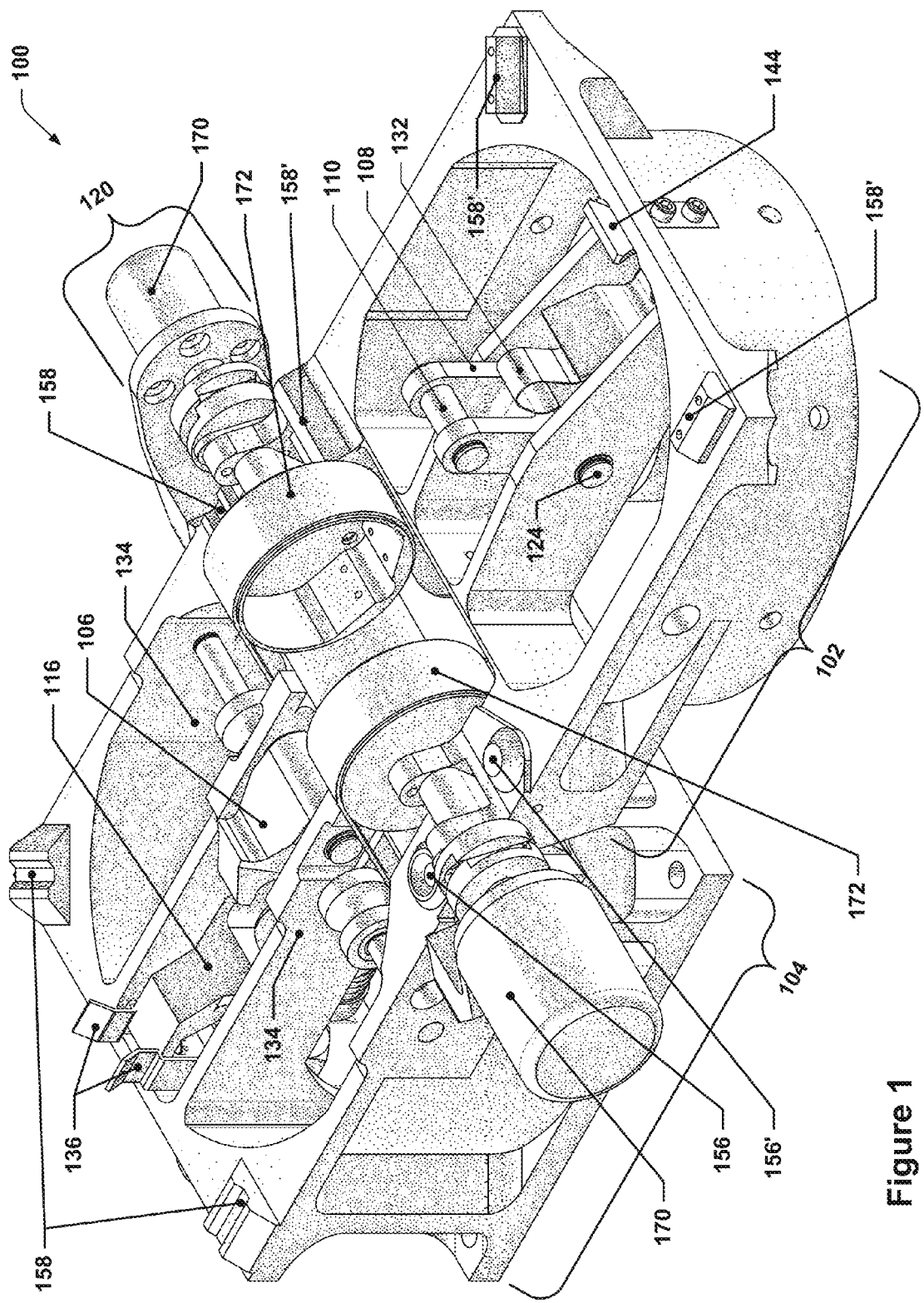
FIG. 1 depicts an isometric view of an example latching hinge in a hinge-open state.

FIG. 1 depicts an isometric view of an example latching hinge in a hinge-open state. The latching hinge 100 may include two main parts: a first member 102 and a second member 104. The first member 102 may be joined to the second member 104 via a hinge pivot 120 such that the first member 102 and the second member 104 may be rotated relative to each other about a hinge axis of the hinge pivot 120 so as to be transitionable between a hinge-open state, shown in FIG. 1, and a hinge-closed state, shown in FIG. 2. As will be discussed later, in some implementations, the hinge pivot 120 may be a "loose-fit" hinge interface with engineered-in radial compliance. As shown, the hinge pivot 120 includes various components, e.g., spring drums 172, rotational dampers 170, and various other components, either not shown or not indicated, that, in aggregate, may provide for rotational movement between the first member 102 and the second member 104.

The latching hinge 100 in this example is a spring-driven hinge, i.e., the first member 102 and the second member 104 are urged into the hinge-closed state from the hinge-open state by a deformed spring of some sort. In this particular example, two torsion springs 134 are used to apply a rotational moment about the hinge pivot 120 that will cause the first member 102 to rotate with respect to the second member 104. This assumes that the second member 104 is fixed in space—the reverse arrangement is, of course, also possible. The torsion springs 134 may be constant-torque or near-constant torque springs, for example, having an average torque during hinge actuation that stays within ±10% of a given nominal torque value.

The first member 102 and the second member 104 may also include various alignment features that act to ensure that the first member 102 and the second member 104 are correctly aligned with one another in the hinge-closed state. These alignment features may include a radial alignment feature with a concave conic surface 156 on the second member 104 and a complementary convex conic surface 156' on the first member 102. It is to be understood that the concave conic surface 156 may also be located on the first member 102 and the convex conic surface 156' may correspondingly be located on the second member 104 in some implementations. The radial alignment feature may act to anchor the first member 102 in space relative to the second member 104 when the latching hinge 100 is in the hinge-closed state. In addition to the radial alignment feature, two or more linear alignment features, each with a concave prismatic surface 158 and a complementary convex prismatic surface 158', may be located at other locations on the first member 102 and the second member 104. The concave prismatic surfaces 158, in this example, are symmetrical trapezoidal troughs with the trough axis passing through the center of the concave conic surface 156, and the convex prismatic surfaces 158', in this example, are matching symmetrical trapezoidal protrusions, although sized such that only the sloped sides of the trapezoidal cross-sections are in contact with one another when the concave prismatic surface 158 and the convex prismatic surface 158' are in contact with one another; the same is true for the concave conic surface 156 and the convex conic surface 156'. This arrangement allows the concave prismatic surface 158 and the convex prismatic surface 158' to slide relative to each other along an axis that passes through the radial alignment feature, which, for example, allows for independent expansion/contraction of the first member 102 and the second member 104 due to different amounts of thermal expansion arising from non-uniform temperature distributions in the latching hinge 100. For example, the portion of the latching hinge that is attached to a spacecraft body may be exposed to heat that flows into it from the spacecraft body, and may thus be warmer than the portions of the latching hinge 100 that are further from the spacecraft body.

Also visible in FIG. 1 are various components that provide latching and preload-transfer functionality. For example, the first member 102 may include a latch link 108 that may have a latch portion 110, in this case, a pin, although other designs may feature a different component or even a feature that provides similar functionality, as discussed herein, but that is an integral part of the latch link 108 rather than a separate component. The latch link 108 may be configured to rotate about a latch link pivot 124, but may be urged to remain in the position shown by a latch link bias spring 132 or other device providing similar functionality. The first member 102 may also include a trigger 144, which may be positioned so as to engage with a release mechanism 136 located on the second member 104.

The second member 104 may also include various components that provide latching and preload-transfer functionality. Visible in FIG. 1 are part of a latch hook 106 and a lever arm component 116. The latch hook 106 may be configured to engage with the latch portion 110 of the latch link 108, thus providing a latch mechanism for the latching hinge 100. A spring-loaded tensioning device, which is not visible in FIGS. 1 and 2 but is detailed in various section views discussed later in this disclosure, may be configured to transfer a compressive load from a compressed spring, via various load-transfer mechanisms/components, to the latch hook/latch portion interface, thus causing a tensile load to be developed across the latch hook and latch link when the two components are in the latched state. This tensile load may, in turn, be resisted by compressive loads that are applied through the contact interfaces of the radial alignment feature and the linear alignment features. Thus, all or substantially all of the loads associated with the transferred pre-load may pass through the latch mechanism and the various alignment features provided. Other implementations, however, may omit the above-discussed alignment features and may, for example, feature simple, flat mating surfaces on the first member 102 and the second member 104 for compressive load transfer between the first member 102 and the second member 104.

In addition to the features discussed above, various other features are visible in the Figures discussed herein; the purposes or functions of these features are readily apparent, e.g., fasteners for joining two components together, lock rings for preventing axle components from sliding along their axes, holes for bolting the first member 102 or the second member 104 to other structures such as spacecraft bodies or equipment booms, etc. and are thus not described in detail. Other components that may be included in the latching hinge 100 may include rotational damper units that act to limit the rotational velocity of the first member 102 and the second member 104 (the cylindrical structures on the outer ends of the hinge pivot 120).

Figure 10:
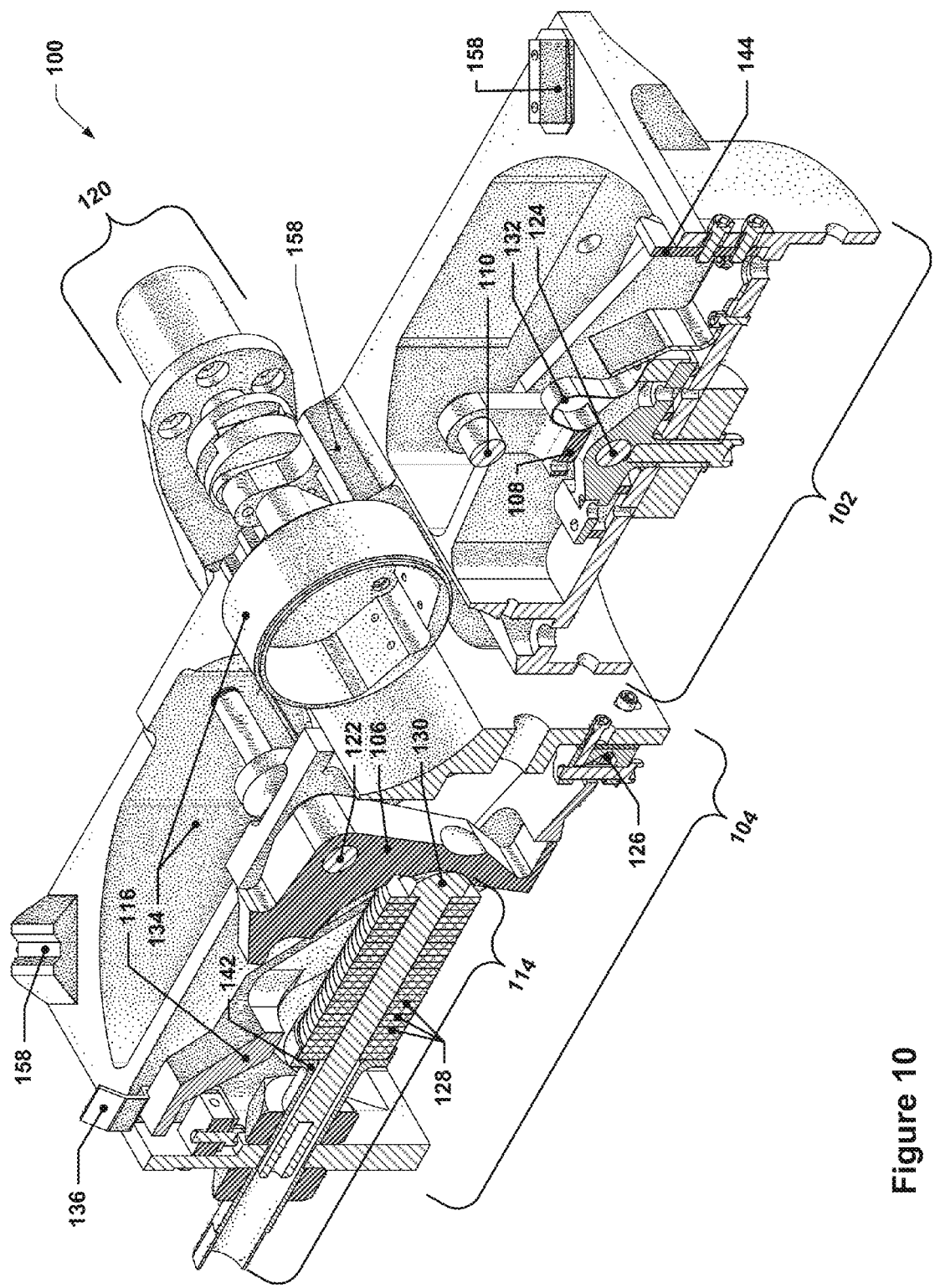
FIG. 10 depicts an isometric section view of the latching hinge of FIGS. 1 and 2 in the hinge-open state.
Figure 11:
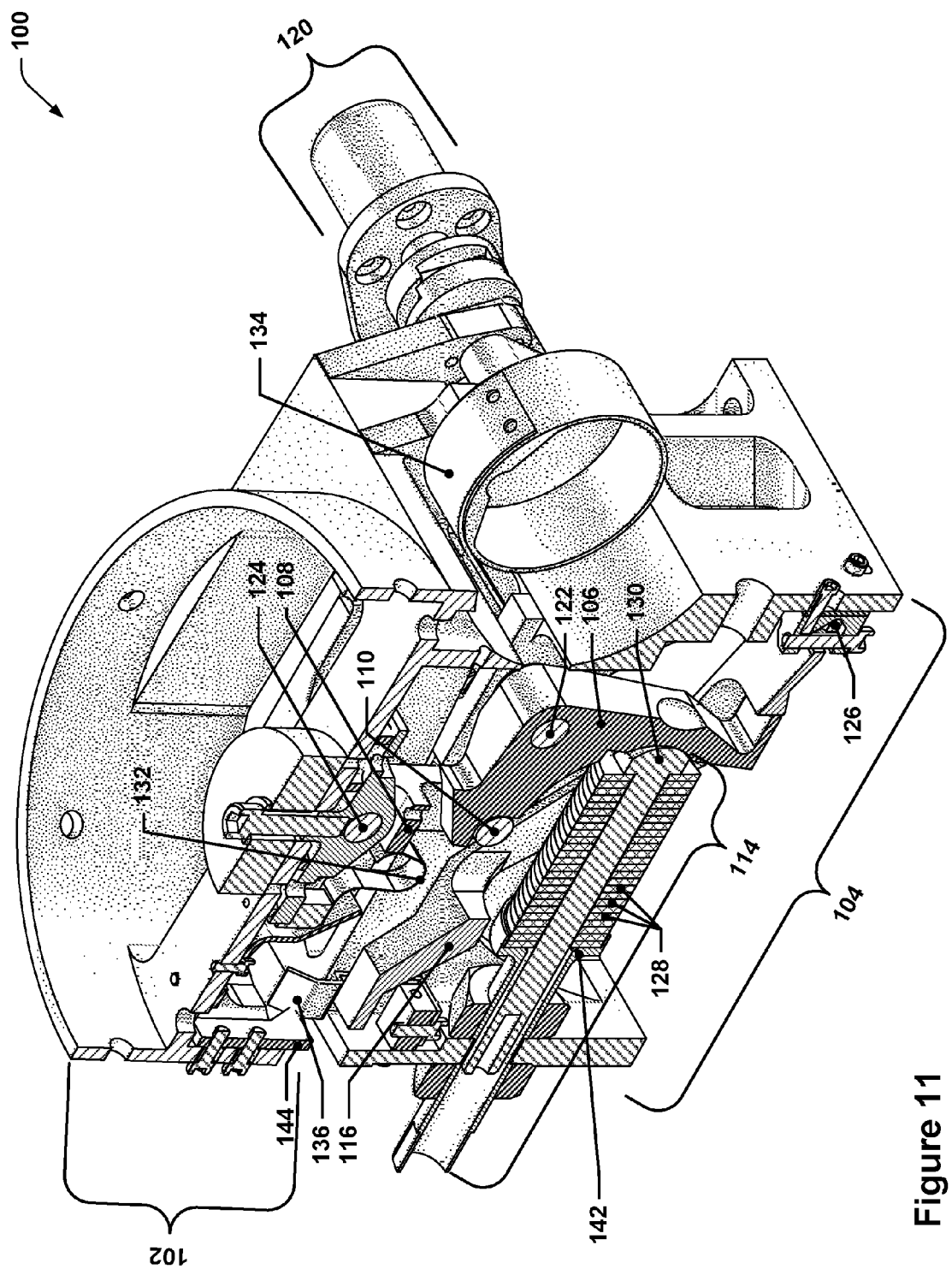
FIG. 11 depicts an isometric section view of the latching hinge of FIGS. 1 and 2 during the transition between the hinge-open state and the hinge-closed state and after the latch link and the latch hook have latched.
Figure 12:
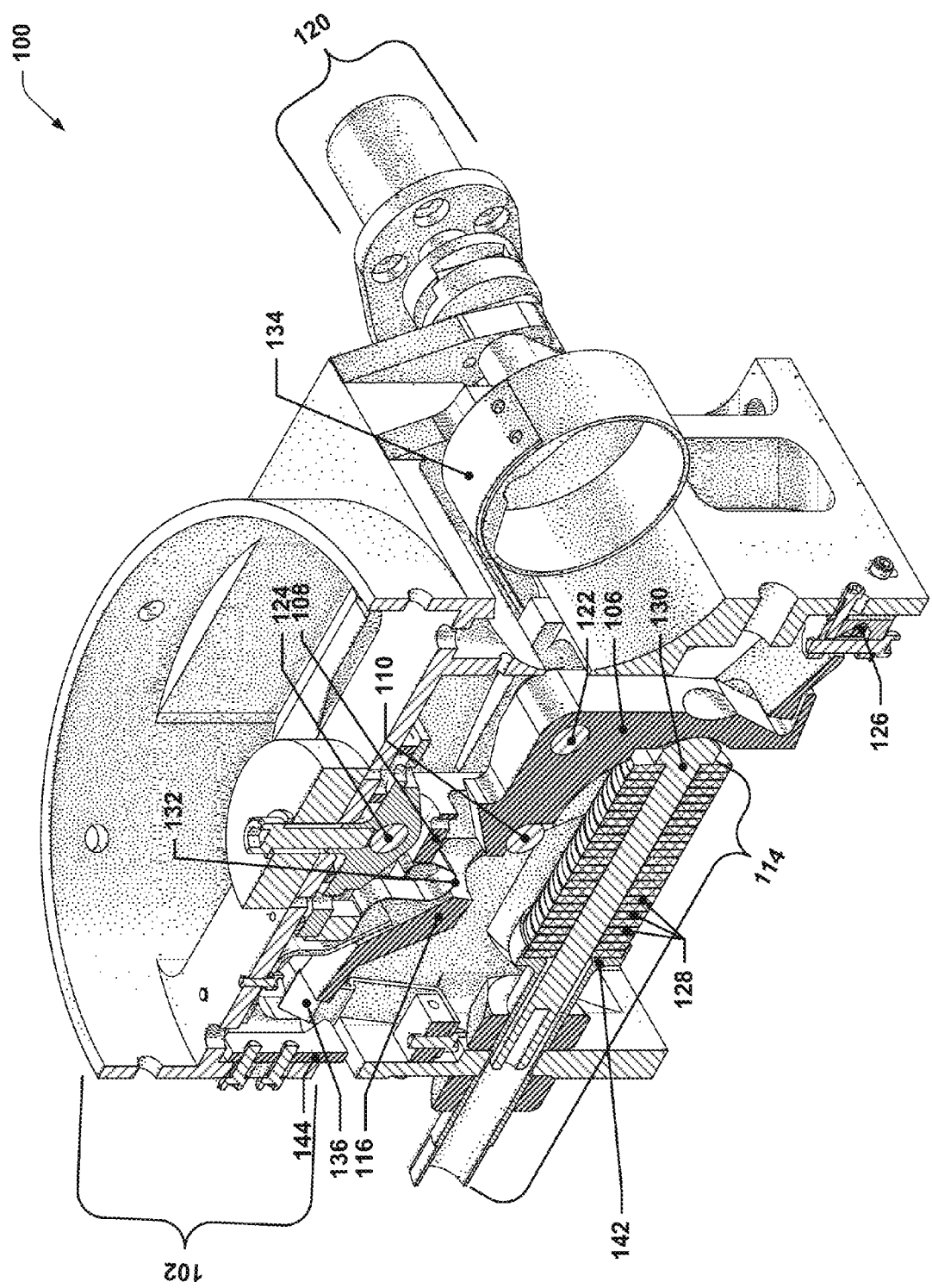
FIG. 12 depicts an isometric section view of the latching hinge of FIGS. 1 and 2 in the hinge-closed state.

FIGS. 3 through 9 depict section views of the latching hinge 100 at various points of transition between, and inclusive of, the hinge-open state and the hinge-closed state. For further understanding, FIGS. 10 through 12 depict isometric section views that correspond with the views shown in FIGS. 1, 7, and 9, respectively.

Figure 2:
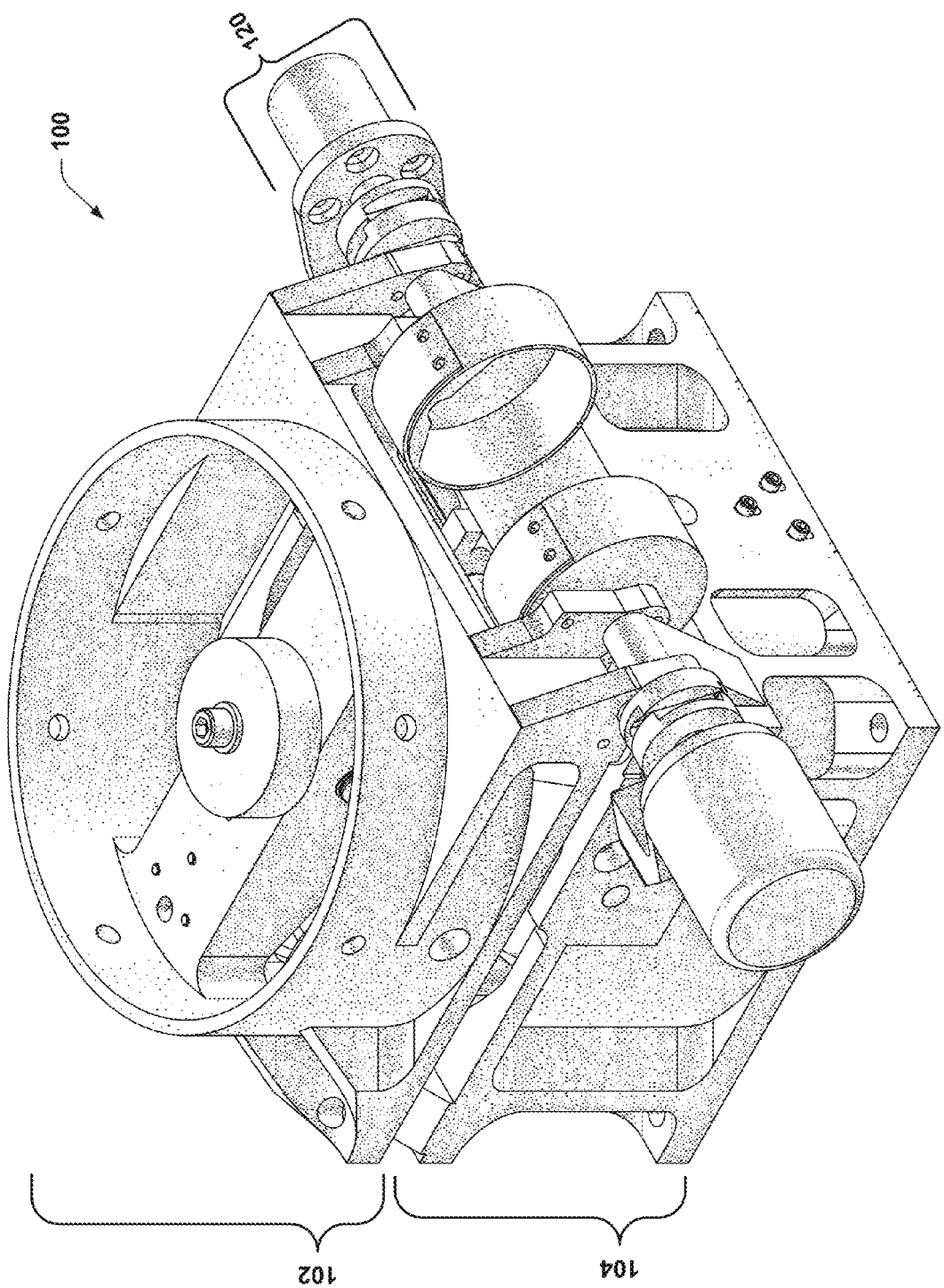
FIG. 2 depicts an isometric view of the example latching hinge of FIG. 3 in a hinge-closed state.
Figure 3:
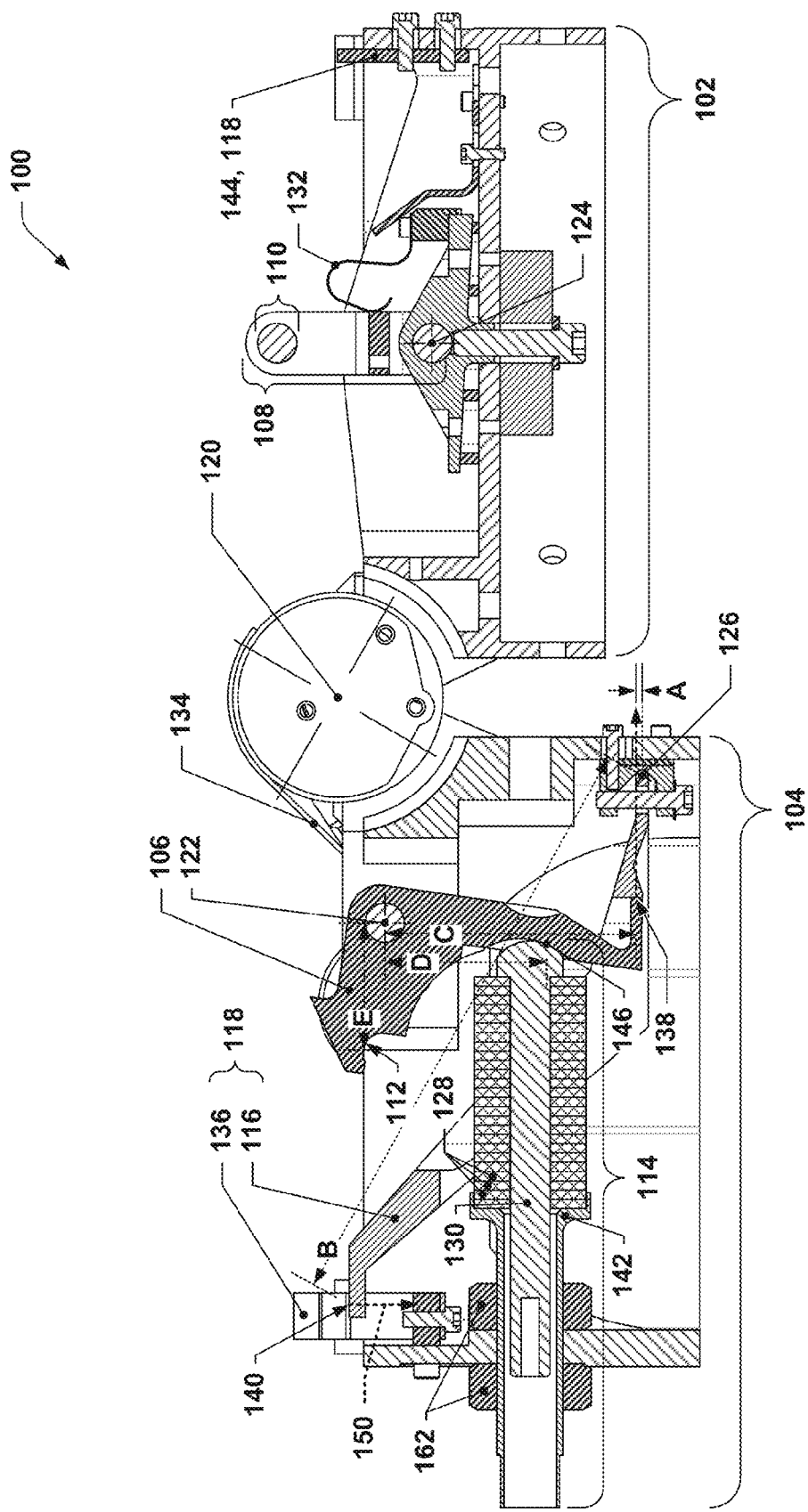
FIG. 3 depicts a side section view of the example latching hinge of FIGS. 1 and 2 in the hinge-open state.

FIG. 3 depicts a side section view of the example latching hinge of FIGS. 1 and 2 in the hinge-open state. As can be seen, many of the components discussed above with respect to FIGS. 1 and 2 are visible in greater detail in FIG. 1, as well as many additional components that were not visible in FIGS. 1 and 2.

For example, the spring-loaded tensioning device 114 is depicted. The spring-loaded tensioning device 114 may include a base 142 that may be fixed in space relative to the second member 104. The base may, for example, be a threaded tube with a flanged end that interfaces with a spring of some sort. The spring, in this example, is provided by a plurality of conical washers, or Belleville washers, that are stacked on a guide of some sort. In this example, the guide is provided by a plunger 130, which includes a shaft that is sized so as to be insertable through the center hole of each Belleville washer and that has larger-diameter end portion that is configured to bear against a portion of the latch hook 106. The latch hook 106 may be configured to rotate about a first pivot 122; the force applied to the latch hook 106 by the plunger 130 may thus generate a moment in the latch hook 106 about the first pivot 122.

The Belleville washers may be stacked on the guide in alternating directions, e.g., with the cone angles of each pair of adjacent Belleville washes facing in opposite directions. When the plunger 130 is compressed into the base 142, this causes the Belleville washers to flatten, i.e., the cone angle of the Belleville washers is reduced in response to the applied load. The Belleville washer stack shown in FIG. 3 has been compressed by the plunger 130 to such an extent that each Belleville washer 128 has been flattened completely and looks, in cross-section, like a normal, flat washer. The base 142 may be held in place with respect to the second member 104 by two jam nuts that interface with the threaded portion of the base 142. This allows the base position relative to the latch hook 106 along the spring extension axis to be fine-tuned. The plunger 130 may also have features, e.g., a threaded female hole on the end opposite the larger-diameter end portion, that allow a tool of some sort to be used to pull the plunger towards the base, thus compressing the spring, during installation and initial setup. It is to be understood that while the pictured implementation features a stack of alternating Belleville washers, it is also possible to achieve a similar effect with a stack of Belleville washers all oriented in the same direction or in a mixture of alternating and same directions. Alternating Belleville washers may be used to provide increased stroke length at the expense of force, and same-direction Belleville washers may be used to provide increased force at the expense of stroke length. It is also to be understood that other types of springs may be used in place of a Belleville washer stack, if desired—for example, a traditional coil spring may be used instead. While a linear spring is shown, similar functionality may be provided using other types of spring devices, such as torsion springs that are configured to generate the moment in the latch hook 106 about the first pivot 122). A "linear spring," as used herein, refers to a spring that acts along a generally linear path and does not mean that the spring necessarily has a linear force/displacement curve; although such may be the case, linear springs may also have non-linear force/displacement curves. Such alternative implementations are also considered to be within the scope of this disclosure.

The latch hook 106 may, as discussed above, be configured to rotate about the first pivot 122. The latch hook 106 may also have a contact surface 112 that is designed to contact the latch portion 110 of the latch link 108 when the latching hinge 100 is in the closed state and an attempt is made to transition the latching hinge 100 back into the open state. This assumes that the preload from the spring-loaded tensioning device 114 has not yet been transferred to the latch mechanism—if this has occurred, then the contact surface 112 and the latch portion 110 will be drawn into compressive contact by the transferred pre-load.

Also visible in greater detail in FIG. 3 is the lever arm component 116, which, in conjunction with the release mechanism 136, may provide a trigger mechanism 118 that may be transitioned between an untriggered state and a triggered state. In the untriggered state, the trigger mechanism 118 may restrain the lever arm component 116, whereas in the triggered state, the trigger mechanism 118 may permit the lever arm component 116 to move. The lever arm component 116 may include a fulcrum 126 about which the lever arm component 116 is configured to rotate. The fulcrum 126, in this case, is provided by a rounded tip on the lever arm component 116 that rests in a V-shaped trough having a matching rounded bottom; a screw that passes through a hole in the lever arm component 116 prevents the lever arm component 116 from falling out of the trough if there is no load applied to the lever arm component 116 that pushes the lever arm component 116 into the trough. As can be seen, the lever arm component 116 is a third-class lever, although other implementations may utilize other classes of lever for the lever arm component 116.

In FIG. 1, the spring-loaded tensioning device 114 has been compressed into a first compressed state that causes the spring to apply a first compressive load to the latch hook 106 via the plunger 130 at compressive contact 146. When the spring-loaded tensioning device 114 is released, it may enter a second compressed state and apply a second compressive load to the latch hook 106 that is lower in magnitude than the first compressive load. This, in turn causes a moment to be developed in the latch hook 106 around the first pivot 122—the moment arm, in this case, is the distance D shown in FIG. 1. The latch hook 106 is restrained from rotating about the first pivot 122 by a countervailing torque developed through contact of the latch hook 106 with the lever arm component 116 at a first contact zone 138. In this case, the lever arm component 116 applies a resisting force to the latch hook 106 via the first contact zone 138 that acts across the moment arm C; in this particular example, the resisting force will be less than the first compressive load since the moment arm C is greater than the moment arm D.

The force applied to the first contact zone 138 by the latch hook 106 is, in turn, transmitted through the lever arm component 116 to the fulcrum 126. As can be seen, the direction along which this force is applied, i.e., the peak magnitude vector of the force, is offset from the fulcrum by a distance A, causing a moment to be developed in the lever arm component 116 about the fulcrum 126. This moment causes the lever arm component 116 to attempt to rotate towards the latch hook 106, but the lever arm component 116 is prevented from doing so by a countervailing moment generated by a resistive force 150, which has a peak magnitude vector that is offset by a distance B from the fulcrum 126, applied to the moment arm component at a second contact zone 140, which is formed between the lever arm component 116 and the release mechanism 136. The distance A may, in some implementations, be at least an order of magnitude less than the distance B.

Figure 4:
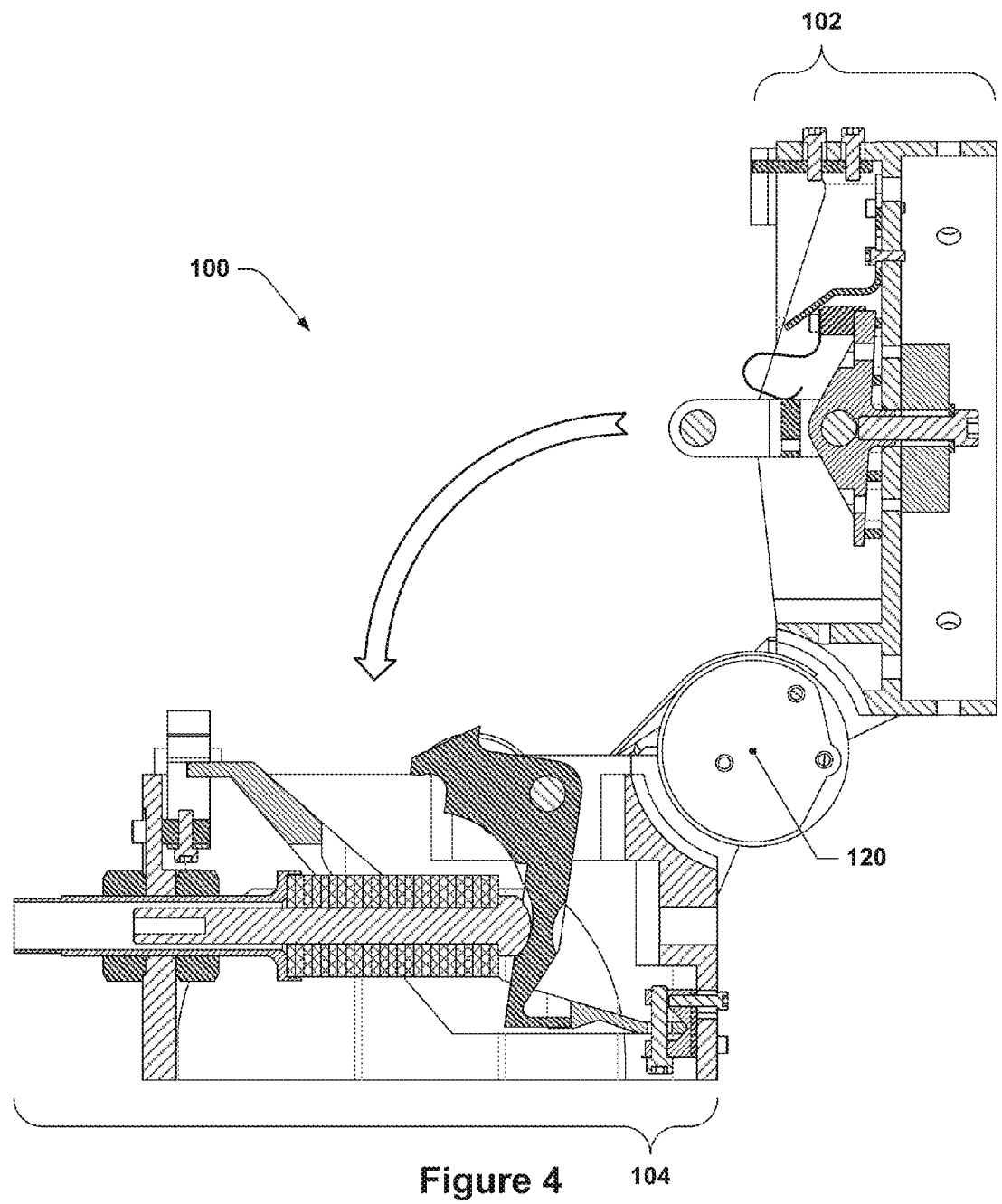
FIG. 4 depicts a side section view of the example latching hinge of FIGS. 1 and 2 in a state approximately halfway between the hinge-open state and a hinge-closed state.

FIG. 4 depicts a side section view of the example latching hinge of FIGS. 1 and 2 in a state approximately halfway between the hinge-open state and a hinge-closed state. As can be seen, the positions of the components housed in each of the first member 102 and the second member 104 relative to those respective components has not changed from the positions shown in FIG. 1, although the second member 104 is rotating, and has rotated approximately 90°, about the hinge pivot 120 with respect to the first member 102. It is to be understood that while the hinge-open state discussed herein has been shown as a state wherein the hinge in question is open to an angle of 180°, the hinge-open state may also correspond to a variety of other states, e.g., such as a state where the hinge must move through only 30°, 60°, 90°, 120°, 150°, or various other angles in order to reach the hinge-closed state. Broadly speaking, the hinge-open state may be any state in which the latch hook and the latch portion of the latch link are not latched together, although the normal hinge-open state for a latching hinge will typically be at angles such as 90° or 180° of angular separate between the first member 102 and the second member 104.

Figure 5:
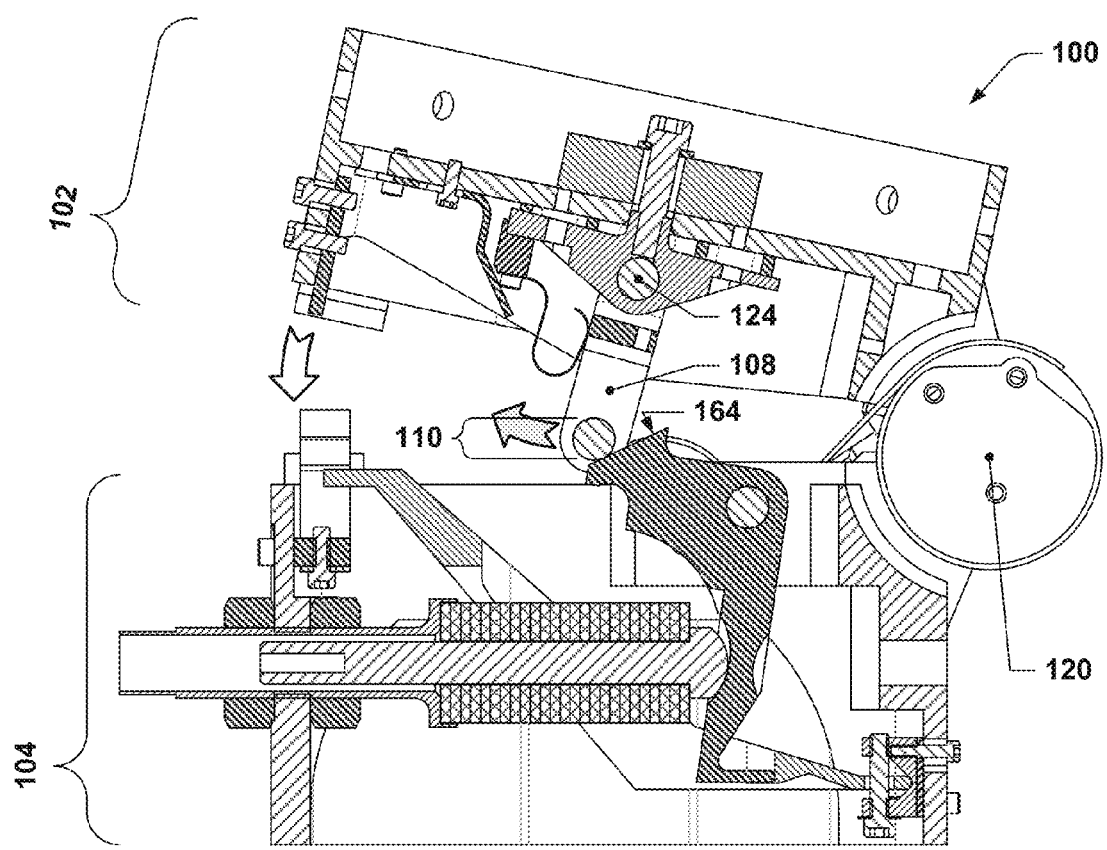
FIG. 5 depicts a side section view of the example latching hinge of FIGS. 1 and 2 in a state of transition from the hinge-open state to the hinge-closed state where a latch portion of a latch link has contacted a portion of the latch hook.

FIG. 5 depicts a side section view of the example latching hinge of FIGS. 1 and 2 in a state of transition from the hinge-open state to the hinge-closed state where a latch portion of a latch link has contacted a portion of the latch hook. As can be seen, the first member 102 1 has rotated about the hinge pivot 120 with respect to the second member 104 1 such that the latch portion 110 of the latch link 108 has contacted a sloped surface 164 of the latch hook 106. As the first member 102 1 continues to rotate about the hinge pivot 120; such continued movement is indicated by the white arrow, the sloped surface 164 will cause the latch portion 110 and the latch link 108 to rotate about the latch link pivot 124 and move in the direction shown by the grey arrow.

Figure 6:
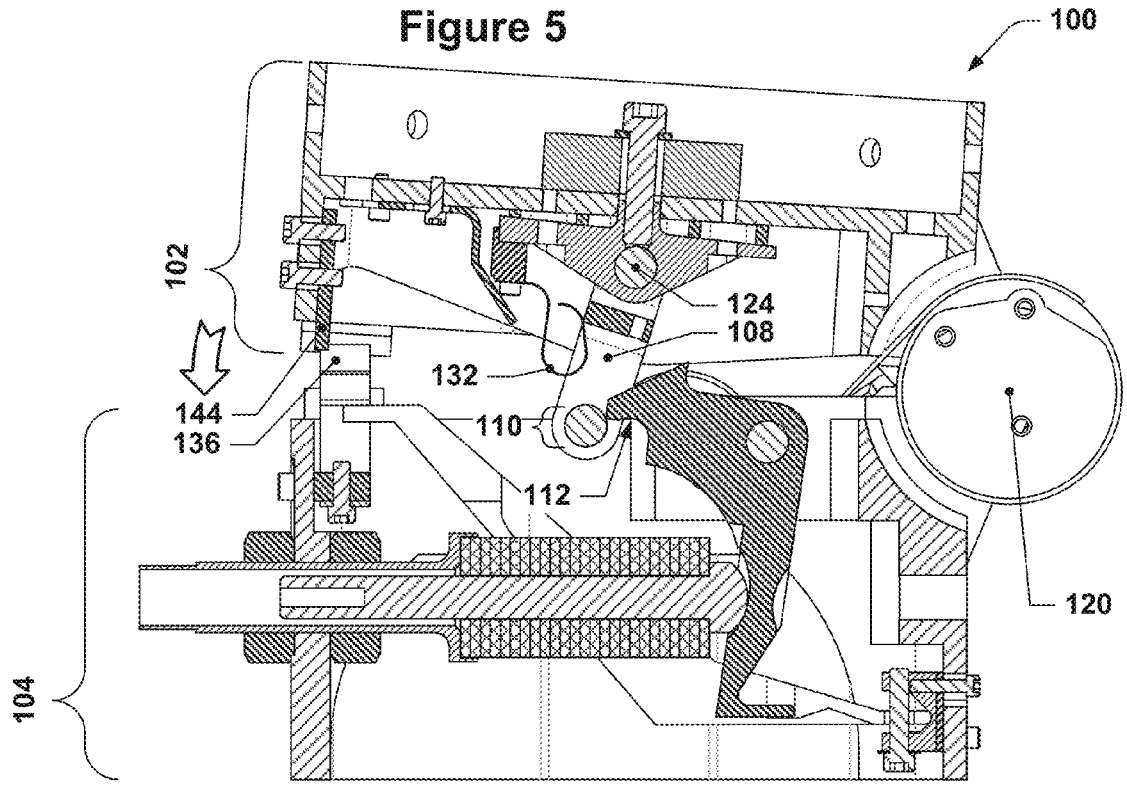
FIG. 6 depicts a side section view of the example latching hinge of FIGS. 1 and 2 in a state of transition from the hinge-open state to the hinge-closed state where the latch portion of the latch link has been deflected due to the portion of the latch hook.

FIG. 6 depicts a side section view of the example latching hinge of FIGS. 1 and 2 in a state of transition from the hinge-open state to the hinge-closed state where the latch portion of the latch link has been deflected due to the portion of the latch hook. As can be seen in FIG. 6, the latch portion 110 and the latch link 108 have rotated about the latch link pivot 124; the latch portion 110 is held against the latch hook 106 by the latch link bias spring 132, which acts to urge the latch link 108 back into its previous position.

Figure 7:
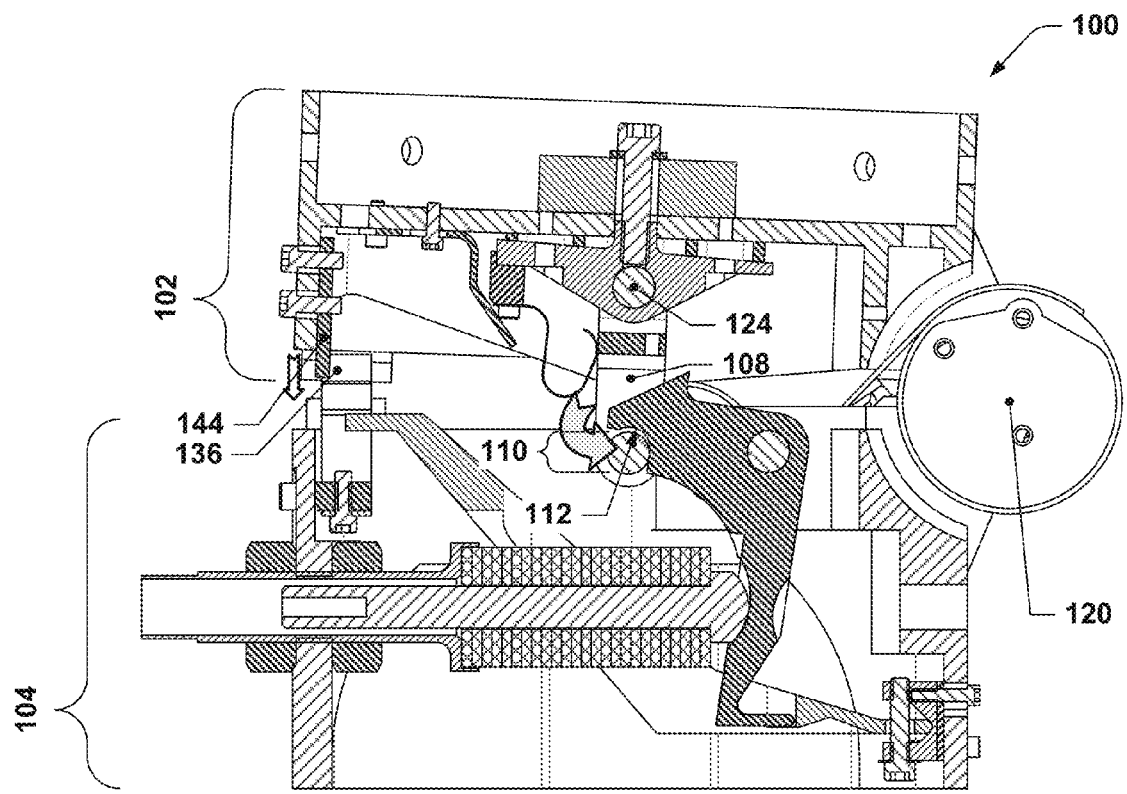
FIG. 7 depicts a side section view of the example latching hinge of FIGS. 1 and 2 in a state of transition from the hinge-open state to the hinge-closed state where the latch link and the latch hook have latched together.

FIG. 7 depicts a side section view of the example latching hinge of FIGS. 1 and 2 in a state of transition from the hinge-open state to the hinge-closed state where the latch link and the latch hook have latched together. As can be seen in FIG. 7, the latch link 108 has been forced back into to its original position with respect to the first member 102 by the latch link bias spring 132, causing the latch portion 110 to move into a position proximate to the contact surface 112. The contact surface 112, in this arrangement, faces the latch portion 110. At this point, the latching hinge 100 is considered latched since any attempt to return the first member 102 and the second member 104 to the open state will cause the latch portion 110 of the latch link 108 to be drawn into contact with the contact surface 112 of the latch hook 106. Thus, while some small amount of clearance may exist between the latch portion 110 and the contact surface 112, as shown in FIG. 7, this clearance may only permit a small amount of rotational movement, e.g., ~1°-2°, between the first member 102 and the second member 104 before the latch portion 110 contacts the contact surface 112 and causes the rotation to stop.

Figure 9:
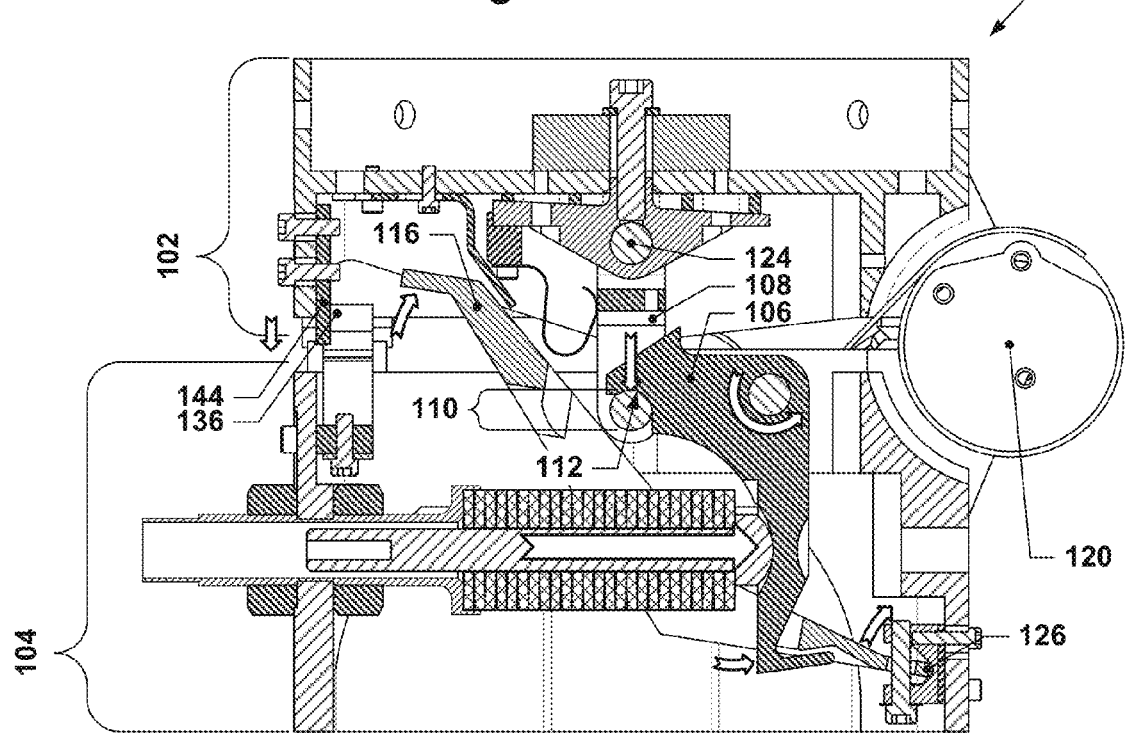
FIG. 9 depicts a side section view of the example latching hinge of FIGS. 1 and 2 in the hinge-closed state.

FIG. 9 depicts a side section view of the example latching hinge of FIGS. 1 and 2 in the hinge-closed state. In FIG. 9, a number of components have moved in rapid succession or simultaneously. First, as the first member 102 rotated into the closed state with respect to the second member 104, the trigger 144 engaged the release mechanism 136 and caused it to release the portion of the lever arm component 116 that was bearing on the second contact zone 140. In other words, the trigger mechanism 118 transitioned from the untriggered state to the triggered state. Once released, the moment on the lever arm component about the fulcrum 126 caused by the application of force by the latch hook 106 to the first contact zone 138 causes the lever arm component 116 to pivot towards the latch hook 106 about the fulcrum 126. In doing so, the portion of the lever arm component 1116 that provided the first contact zone 138 is moved into a position where it no longer resists movement of the latch hook 106, at least for some amount of rotation of the latch hook 106 about the first pivot 122. Once the lever arm component 116 has moved and no longer restrains the latch hook 106, the latch hook 106 rotates about the first pivot 122, allowing the spring-loaded tensioning device 114 to transition into the second compressed state that applies a second compressive load to the latch hook 106 and that causes the contact surface 112 to be drawn into the latch portion 110. The latch hook 106 thus acts as a lever arm that transfers the second compressive load from the spring-loaded tensioning device to the latch link 108, thus causing the latch link 108 to pull features on the first member 102, e.g., concave prismatic surfaces 158 and concave conical surface 156, into compressive contact with features on the second member 104, e.g., convex prismatic surfaces 158' and convex conical surface 156'. Put another way, the torque about the first pivot 122 by the application of the second compressive load to the latch hook 106 is applied to the latch portion 112 across a moment arm of distance E.

As discussed above, the spring-loaded tensioning device may be provided using a stack of Belleville washers or other spring-type devices, e.g., coil springs. FIGS. 8A and 8B depict section views of an example spring-loaded tensioning device using Belleville washers in two different states of compression. As can be seen, the spring loaded tensioning device shown has a series of Belleville washers 828 stacked end-to-end along the length of a plunger 830, and are compressed between the end of the plunger 830 and the shoulder of a base 842. In FIG. 8A, the washer stack is compressed to the limit of compressibility, i.e., the Belleville washers, which are normally conical, have been squashed flat. In FIG. 8B, the washer stack has decompressed somewhat and caused the plunger 830 to extend slightly. As can be seen, there is now an angular gap that has appeared in between each pair of Belleville washers 828.

Many of the components of the latching hinge may be made from any of a variety of materials, including aluminum alloys, steel alloys, magnesium alloys, titanium alloys, or other metals or alloys. In some implementations, some of the components may be made from non-metallic materials such as plastics or composites. In the particular implementation shown in FIGS. 1 through 9, the first member 102 and the second member 104 were made from an aluminum alloy, whereas most of the other components discussed above were made from one or more different steel alloy.

Various aspects of the example shown in FIGS. 1 through 9 are discussed in greater detail below, although it is to be understood that these characteristics are subject to a wide degree of variation depending on a particular implementation of the concepts described herein. The hinge depicted in FIGS. 1 through 9 is sized to accommodate equipment booms approximately 6" in diameter, and the Belleville washer stack is compressed to a first compressive load of approximately 1500±200 pounds-force when the spring-loaded tensioning device 114 is in the first compressed state. Due to the different sizes of moment arm used in the latch hook 106 and the lever arm mechanism 116, the amount of force that needs to be applied to the lever arm component 116 via the second contact zone 140 is approximately 10±1 pounds-force (compared to the ~1500 pounds-force that the lever arm mechanism restrains).

The latch portion 110 and the latch hook 106 latch together after the first member 102 and the second member 104 have rotated such that only about 2° of further relative rotation remains before the first member 102 and the second member 104 are in the hinge-closed state. The trigger 144 is designed to engage the release mechanism 136 and cause the release mechanism 136 to release the lever arm component 116 at some point between 2° and 0° of remaining closure angle. Once the spring-loaded tensioning device 114 has been released, it may extend the plunger 130 and enter the second compressed state, where it may apply a load of approximately 700 to 800 pounds-force to the latch hook 106. This 700 to 800 pounds-force load is then rotationally coupled about the first pivot 122 and applied to the latch portion 110 of the latch link 108; due to the fact that the moment arms to the first pivot 122 differ in length between these two force applications, the latch portion 110 may experience a corresponding 810±100 pounds-force of load due to the application of 700 to 800 pounds-force of load to the latch hook 106 by the spring-loaded tensioning device 114. Thus, as is clearly seen in this particular example, nearly a half-ton of preload may be transferred to the latch mechanism within one or two degrees of the latch mechanism latching, resulting in a latching hinge that is capable of withstanding—without any gaps forming between the first member and the second member—significant bending loads, e.g., greater than 1500 inch-pounds, that are applied via a connected equipment boom. Moreover, if the hinge pivot is constructed such that there are radial clearances within the hinge pivot and such that the rotational bearing surfaces of the hinge pivot do not contact one another due to forces exerted on the first and second members by the preload mechanism when the latching hinge is in the hinge-closed state, then none of this preload will be applied to the rotational components of the pivot hinge but may instead all be transferred directly from the first member to the second member.

While the above-discussed example provides a solid understanding of the concepts towards which this disclosure is directed, the concepts discussed herein are not limited to the above-discussed variant alone. Various other configurations of such latching hinges may implement similar concepts. A discussion of some of these alternative implementations follows.

FIG. 13 depicts a simplified diagram of a latching hinge with a spring-loaded tensioning device similar to the example shown in FIGS. 2 through 12. In FIG. 13, a first member 1302 and a second member 1304 are rotatably coupled by a hinge pivot 1320 and contact each other at linear alignment features 1358 and a radial alignment feature 1356 when in the hinge-closed state. A latch hook 1306 that may pivot about a first pivot 1322, located in the second member 1304, is acted on by a spring-loaded tensioning device 1314; the latch hook 1306 is prevented from rotating by a lever arm component 1316, which is configured to rotate about a fulcrum 1326 but is restrained from doing so by a release mechanism (not pictured, but similar, for example, to the release mechanism shown in FIGS. 1 through 1) acting on the opposite end of the lever arm component 1316 from the fulcrum 1326. A latch link 1308, which is rotatable about a latch link pivot 1324, located in the first member 1302, may have a latch portion 1310 that engages with the latch hook 1306. The dotted outline shows how the latch link may rotate about the latch link pivot 1324 in order for the latch portion 1310 to clear the latch hook 1306 as the first member 1302 and the second member 1304 are transitioned to the hinge-closed state. This example functions, in essence, in the same manner as the example latching hinge 100 discussed above.

FIG. 14 depicts a simplified diagram of an alternative mechanism for a latching hinge with a spring-loaded tensioning device. In FIG. 14, a first member 1402 and a second member 1404 are rotatably coupled by a hinge pivot 1420 and contact each other at linear alignment features 1458 and a radial alignment feature 1456 when in the hinge-closed state. A latch hook 1406 that may pivot about a first pivot 1422, located in the second member 1404, is acted on by a spring-loaded tensioning device 1414; the latch hook 1406 is prevented from rotating by a lever arm component 1416, which is configured to rotate about a fulcrum 1426 but is restrained from doing so by a release mechanism (not pictured, but similar, for example, to the release mechanism shown in FIGS. 1 through 1) acting on the opposite end of the lever arm component 1416 from the fulcrum 1426. A latch link 1408, which is rotatable about a latch link pivot 1424, located in the first member 1402, may have a latch portion 1410 that engages with the latch hook 1406. The dotted outline shows how the latch link may rotate about the latch link pivot 1424 in order for the latch portion 1410 to clear the latch hook 1406 as the first member 1402 and the second member 1404 are transitioned to the hinge-closed state. This implementation is very similar to that shown in FIG. 13, with the chief difference being that the spring-loaded tensioning device 1414 has been moved to a different location and has been re-oriented such that it exerts force in a primarily vertical direction with respect to the orientation of the Figure and exerts such force on a different area of the latch hook 1406. The latch hook 1406 is also somewhat altered from the latch hook 1406 to accommodate the new spring-loaded tensioning device 1414 location. In one sense, the spring-loaded tensioning device 1314 of FIG. 13 may be viewed as exerting force along a spring extension axis that is generally perpendicular to the direction along which the tensile load is induced whereas the spring-loaded tensioning device 1414 of FIG. 14 may be viewed as exerting force along a spring extension axis that is generally aligned with the direction along which the tensile load is induced. Of course, other implementations may feature a spring extension axis that extends along other directions, e.g., a direction oblique to the tensile load direction.

FIG. 15 depicts a simplified diagram of another alternative mechanism for a latching hinge with a spring-loaded tensioning device. In FIG. 15, a first member 1502 and a second member 1504 are rotatably coupled by a hinge pivot 1520 and contact each other at linear alignment features 1558 and a radial alignment feature 1556 when in the hinge-closed state. A latch hook 1506 is provided that is fixed with respect to the second member 1504. A latch link 1508, located in the first member 1502, may be supported by a crank arm 1570 that may be configured to rotate about a first pivot 1522; the latch link 1508 may be connected to the crank arm 1570 such that it may rotate about a latch link pivot 1524 with respect to the crank arm 1570. The crank arm 1570 may be restrained from rotating about the first pivot 1522 by a lever arm component 1516, which is configured to rotate about a fulcrum 1526 but is restrained from doing so by a release mechanism (not pictured, but similar, for example, to the release mechanism shown in FIGS. 1 through 1) acting on the opposite end of the lever arm component 1516 from the fulcrum 1526. The latch link 1508 may have a latch portion 1510 that engages with the latch hook 1506. The dotted outline shows how the latch link may rotate about the latch link pivot 1524 in order for the latch portion 1510 to clear the latch hook 1506 as the first member 1502 and the second member 1504 are transitioned to the hinge-closed state. When the lever arm component 1516 is released by the release mechanism, the lever arm component 1516 may allow the crank arm 1570 to rotate about the first pivot 1522 due to force exerted on the crank arm 1570 by a spring-loaded tensioning device 1514. This may cause the latch link pivot 1524, and thus the latch link 1508, to be drawn away from the second member 1504, which, in turn, causes the latch hook 1506 to pull the second member 1504 and the first member 1502 into contact with one another, e.g., via the radial alignment feature 1556 and the linear alignment features 1558.

FIG. 16 depicts a simplified diagram of yet another alternative mechanism for a latching hinge with a spring-loaded tensioning device. In FIG. 16, a first member 1602 and a second member 1604 are rotatably coupled by a hinge pivot 1620 and contact each other at linear alignment features 1658 and a radial alignment feature 1656 when in the hinge-closed state. A latch hook 1606 is provided that is rotatably coupled to the second member 1604 via a latch pivot 1672. A latch link 1608 may be provided that is part of a link arm 1674 that may be configured to rotate about a first pivot 1622, which is located in the first member 1602; the latch link 1608 may remain motionless with respect to the first member 1602 until spring-loaded tensioning device 1614 is released. The latch hook 1606 may rotate, as indicated by the dotted outline, so as to allow the latch hook 1606 to engage with a latch portion 1610 of the latch link 1608, deflect out of the way of the latch portion 1610, and then snap into its original position so that the latch portion 1610 and the latch hook 1606 latch together. The link arm 1674 may be restrained from rotating about the first pivot 1622 by a lever arm component 1616, which is configured to rotate about a fulcrum 1626 but is restrained from doing so by a release mechanism (not pictured, but similar, for example, to the release mechanism shown in FIGS. 1 through 1) acting on the opposite end of the lever arm component 1616 from the fulcrum 1626. When the lever arm component 1616 is released by the release mechanism, the lever arm component 1616 may allow the link arm 1674 to rotate about the first pivot 1622 due to force exerted on the link arm 1674 by a spring-loaded tensioning device 1614. This may cause the latch link 1608 to be drawn away from the second member 1604 such that the latch portion 1610 contacts the latch hook 1606 and draws the latch hook 1606 towards the first member 1602, which, in turn, causes the second member 1604 and the first member 1602 to be drawn into contact with one another, e.g., via the radial alignment feature 1656 and the linear alignment features 1658.

It is also to be understood that various types of release mechanism and/or triggers may be used in a latching hinge as discussed herein. Two implementations of such a mechanism are discussed below, but it is to be understood that other implementations may be used as well—in general, the release mechanism and trigger may be any device or combination of devices that can provide a restraining force, which may be a very small amount of force, e.g., more than two orders of magnitude less, as compared to the amount of force stored in the spring-loaded tensioning device, to the lever arm component and then release the restraining force after the latching hinge has latched shut.

FIG. 17 depicts a diagram of a release mechanism in an unreleased state. The release mechanism 1736 may be provided by two opposing, thin, spring arms that each have a hole or detent in them. The lever arm component 1716 may have corresponding protrusions that may loosely fit within the holes such that the arms of the release mechanism 1736 restrain the lever arm component 1716 from moving in an "upwards" direction with respect to the orientation in the drawing. When a trigger 1744 approaches the release mechanism 1736, the trigger may force the arms of the release mechanism 1736 apart as it engages the release mechanism 1736, as shown in FIG. 18. Once the arms of the release mechanism 1736 are far enough apart, the protrusions on the lever arm component 1716 no longer engage with the holes in the arms, and the lever arm component 1716 is released. In FIGS. 17 and 18, the trigger 1744 and the lever arm component 1716 are located such that they do not collide with each other, e.g., the trigger 1744 may be "in front" of the lever arm component 1716 in the view shown.

FIG. 19 depicts a diagram of a release mechanism in an unreleased state. The release mechanism 1936 may be provided by two opposing, thin arms that both have a jog in them that forms a ledge that the lever arm component 1916 may push against such that the arms of the release mechanism 1936 restrain the lever arm component 1916 from moving in an "upwards" direction with respect to the orientation in the drawing; the ledge may act as another form of "detent," similar to the holes/detents of FIG. 17. When a trigger 1944 approaches the release mechanism 1936, the trigger may force the arms of the release mechanism 1936 apart as it engages the release mechanism 1936, as shown in FIG. 20. Once the arms of the release mechanism 1936 are far enough apart, the jogs/ledges on the arms of the release mechanism 1936 are no longer in contact with the lever arm component 1916 and allow the lever arm component 1916 to be released. In FIGS. 19 and 20, the trigger 1944 and the lever arm component 1916 are located such that they do not collide with each other, e.g., the trigger 1944 may be "in front" of the lever arm component 1916 in the view shown.

As is apparent from the above discussion, there are a variety of different ways to implement the concepts discussed herein. The illustrated implementations represent only some of the myriad ways in which the concept discussed herein may be implemented, and this disclosure is not intended to be limited to only the pictured implementations. It is to be understood that other implementations that utilize a pre-load transfer mechanism that shifts a pre-compressed spring load from one load path to another in a latching hinge after the latching hinge has latched shut and by using various lever arms are also within the scope of this disclosure.

The latching hinge discussed herein may be used in spacecraft designs to provide a mechanism by which deployable equipment booms may be attached to a spacecraft body such that the deployable equipment booms may be rotated from a stowed configuration into a deployed configuration. In some implementations, multiple latching hinges may be used at the joints of a multi-segment equipment boom, whereas in other implementations, latching hinges may be used to join a single equipment boom to another structure, e.g., the spacecraft body.

FIG. 21 depicts a schematic of a spacecraft with an extensible equipment boom. FIG. 22 depicts a schematic of the spacecraft of FIG. 21 with the extensible equipment boom in a deployed state. As can be seen, spacecraft 2166 features an equipment boom 2168 that is connected to the spacecraft 2166 by a latching hinge 2100, which may be similar to the latching hinges discussed herein. The latching hinge 2100 may, once the equipment boom 2168 is released, cause the equipment boom 2168 to swing away from the spacecraft 2166 into a deployed configuration, as shown in FIG. 22. The latching hinge 2100 may latch into position and then transfer the spring preload from the spring-loaded tensioning device into the latch mechanism, thereby taking up any slop in the rotational joint and also inducing a tensile preload across the hinge.

Although several implementations of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims.

What is claimed is:

1. An apparatus comprising a latching hinge including:
    a first member;
    a second member rotatably coupled to the first member about a hinge pivot;
    a latch link connected with the first member;
    a latch hook connected with the second member;
    a spring-loaded tensioning device; and
    a trigger mechanism, wherein:
        the first member and the second member are configured to be transitioned between a hinge-open state and a hinge-closed state by rotating one of the first member and the second member with respect to the other of the first member and the second member about the hinge pivot,
        at least a portion of at least one of the latch link and the latch hook is configured to move relative to the first member and the second member, respectively, such that the latch hook and a latch portion of the latch link latch together as the first member and the second member are transitioned into the hinge-closed state,
        the latch link and the latch hook prevent the first member and the second member from being transitioned into the hinge-open state from the hinge-closed state when the latch portion of the latch link and the latch hook are latched together,
        the spring-loaded tensioning device is configured to be transitioned between a first compressed state and a second compressed state,
        a tensile load is induced in the latch link and the latch hook when the spring-loaded tensioning device is in the second compressed state and the latch portion of the latch link and the latch hook are latched together, and
        the trigger mechanism:
            (i) is configured to be transitioned between a untriggered state and a triggered state,
            (ii) maintains, in the untriggered state, the spring-loaded tensioning device in the first compressed state, (iii) allows, in the triggered state, the spring-loaded tensioning device to transition from the first compressed state to the second compressed state, and (iv) is configured to transition from the untriggered state to the triggered state after the latch portion of the latch link and the latch hook have latched together.

2. The apparatus of claim 1, wherein:
the latch hook is rotatable about a first pivot,
the spring-loaded tensioning device is configured to exert a first compressive load on a portion of the latch hook to develop a torque about the first pivot when transitioning from the first compressed state to the second compressed state, and
the latch hook is drawn into contact with the latch portion of the latch link responsive to the developed torque.

3. The apparatus of claim 2, further comprising a latch link bias spring, wherein:
the latch link bias spring is configured to bias the latch link towards the position the latch link is in with respect to the first member when the latch link and the latch hook are latched together.

4. The apparatus of claim 3, wherein:
the latch link is configured to rotate about a latch link pivot,
the latch portion of the latch link encounters a sloped surface of the latch hook as the first member and the second member transition from the hinge-open state to the hinge-closed state, and
the sloped surface of the latch hook is oblique to the direction along which the tensile load is induced and engages with the latch portion so as to cause the latch link to rotate about the latch link pivot and deflect the latch link bias spring as the first member and the second member transition into the hinge-closed state.

5. The apparatus of claim 1, wherein the spring-loaded tensioning device includes a linear spring selected from the group consisting of: a coil spring and a plurality of Belleville washers stacked on a common guide that passes through the center of each Belleville washer.

6. The apparatus of claim 5, wherein the spring-loaded tensioning device has a spring extension axis aligned with the direction along which the tensile load is induced in the latch link and the latch hook when the spring-loaded tensioning device is in the second compressed state and the latch portion of the latch link and the latch hook are latched together.

7. The apparatus of claim 5, wherein the spring-loaded tensioning device has a spring extension axis perpendicular to the direction along which the tensile load is induced in the latch link and the latch hook when the spring-loaded tensioning device is in the second compressed state and the latch portion of the latch link and the latch hook are latched together.

8. The apparatus of claim 1, wherein:
the latch link is movably connected with a latch link rotation arm,
the latch link rotation arm is configured to rotate about a first pivot,
the spring-loaded tensioning device is configured to exert a force on a portion of the latch link rotation arm to generate a torque about the first pivot when transitioning from the first compressed state to the second compressed state, and
the latch portion of the latch link is drawn into contact with the latch hook responsive to the torque.

9. The apparatus of claim 1, wherein the trigger mechanism includes:
a lever arm component configured to rotate about a fulcrum,
a trigger, and
a release mechanism, wherein:
the spring-loaded tensioning device exerts a first compressive load on a portion of the latch hook in the first compressed state and a second compressive load on a portion of the latch hook in the second compressed state,
the latch hook contacts the lever arm component and transfers the first compressive load from the spring-loaded tensioning device to a first contact zone of the lever arm component and along a first peak magnitude vector when the trigger mechanism is in the untriggered state and transfers the second compressive load to the latch portion of the latch link when the trigger mechanism is in the triggered state,
the release mechanism is configured to contact the lever arm component at at least one second contact zone and apply a third compressive load on the at least one second contact zone and along a second peak magnitude vector when the spring-loaded tensioning device is in the untriggered state, and
the release mechanism is configured to release the lever arm component by removing the third compressive load responsive to engagement with a portion of the first member.

10. The apparatus of claim 9, wherein:
the release mechanism is provided by at least one spring arm with a detent,
the detent engages with the lever arm component at the second contact zone and resists movement of the lever arm component due to the first compressive load when engaged,
the trigger is configured to contact the at least one spring arm and to deflect the at least one spring arm as the first member and the second member are transitioned into the hinge-closed state, and
the deflection of the at least one spring arm by the trigger causes the detent to move such that the detent releases the lever arm.

11. The apparatus of claim 9, wherein:
the shortest distance A between the first peak magnitude vector and the fulcrum is at least an order of magnitude less than the shortest distance B between the second peak magnitude vector and the fulcrum.

12. The apparatus of claim 11, wherein:
the shortest distance A between the first peak magnitude vector and the fulcrum is less than $\frac{1}{50}^{th}$ of the shortest distance B between the second peak magnitude vector and the fulcrum.

13. The apparatus of claim 9, wherein:
the first compressive load is approximately 1500 lbf±200 lbf,
the second compressive load is approximately 750 lbf±100 lbf,
the third compressive load is less than 10 lbf±1 lbf, and
the tensile load is 810 lbf±100 lbf.

14. The apparatus of claim 9, wherein:
the latch hook is configured to rotate about a first pivot, and
the magnitude of the first compressive load is multiplied by the ratio of the shortest distance C between the first pivot and the peak magnitude vector of the first compressive load to the shortest distance D between the first peak magnitude vector and the first pivot as it is transferred to the first contact zone by the latch hook.

15. The apparatus of claim 14, wherein the ratio is less than one.

16. The apparatus of claim 9, wherein:
the lever arm component is a third-class lever configured to pivot about the fulcrum.

17. The apparatus of claim 1, further comprising:
a radial alignment feature pair including a concave conic surface and a complementary convex conic surface; and
two or more linear alignment feature pairs, each linear alignment feature pair including a concave prismatic surface and a complementary convex prismatic surface, wherein:
    one of the concave conic surface and the convex conic surface is located on the first member and the other of the concave surface and the convex conic surface is located on the second member such that the concave conic surface and the convex conic surface contact one another when the first member and the second member are in the hinge-closed state,
    one of the concave prismatic surface and the convex prismatic surface of each linear alignment feature pair is located on the first member and the other of the concave prismatic surface and the convex prismatic surface of the linear alignment feature pair is located on the second member such that the concave prismatic surface and the convex prismatic surface of each linear alignment feature pair contact one another when the first member and the second member are in the hinge-closed state, and
    the concave prismatic surface and the convex prismatic surface of each linear alignment feature pair contact each other along surfaces that bracket an axis that passes through the center axis of the concave conic surface when the first member and the second member are in the hinge-closed state.

18. The apparatus of claim 17, wherein, when the first member and the second member are in the hinge-closed state and the tensile load is induced in the latch link and the latch hook, the tensile load:
    (a) draws the convex conic surface and the concave conic surface of the radial alignment feature pair into contact with one another, and
    (b) draws the convex prismatic surface and the concave conic surface of each linear alignment feature pair into contact with one another.

19. The apparatus of claim 18, wherein:
the hinge pivot includes a radial clearance gap between portions of the hinge pivot that define a rotatable bearing interface provided by the hinge pivot,
there is load transferred between the first member and the second member through the hinge pivot as the first member and the second member transition from the hinge-open state to the hinge-closed state, and
there is no load transferred between the first member and the second member via the hinge pivot when the tensile load in the latch link and the latch hook is present.

20. The apparatus of claim 1, further comprising:
a spacecraft; and
an extensible equipment boom configured to be transitioned between a stowed state and a deployed state, wherein:
    the latching hinge connects the extensible equipment boom with the spacecraft,
    the latching hinge is in the hinge-open state when the extensible equipment boom is in the stowed state, and
    the latching hinge is in the hinge-closed state when the extensible equipment boom is in the deployed state.

* * * * *